(12) United States Patent
Hazama et al.

(10) Patent No.: US 11,077,373 B2
(45) Date of Patent: Aug. 3, 2021

(54) RHYTHM GAME PROGRAM AND GAME SYSTEM

(71) Applicant: SQUARE ENIX CO., LTD., Tokyo (JP)

(72) Inventors: Ichiro Hazama, Tokyo (JP); Masanobu Suzui, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/816,225

(22) Filed: Mar. 11, 2020

(65) Prior Publication Data

US 2020/0289936 A1    Sep. 17, 2020

(30) Foreign Application Priority Data

Mar. 14, 2019   (JP) .............................. JP2019-046936

(51) Int. Cl.
*A63F 13/814*   (2014.01)
*A63F 13/533*   (2014.01)

(52) U.S. Cl.
CPC .......... *A63F 13/533* (2014.09); *A63F 13/814* (2014.09); *A63F 2300/308* (2013.01); *A63F 2300/8047* (2013.01)

(58) Field of Classification Search
CPC ...... A63F 13/533; A63F 13/814; A63F 13/56; A63F 2300/308; A63F 2300/8047
(Continued)

(56) References Cited

U.S. PATENT DOCUMENTS 6,450,888 B1 * 9/2002 Takase .................... A63F 13/10
                                                        463/43
6,786,821 B2 * 9/2004 Nobe ...................... A63F 13/10
                                                        463/31
(Continued)

FOREIGN PATENT DOCUMENTS

JP   2000340616 A   12/2000
JP   2001162044 A   6/2001
(Continued)

OTHER PUBLICATIONS

2nd Office Action for Japanese Patent Appl. No. 2019-046936, dated Jun. 30, 2020.
(Continued)

*Primary Examiner* — Allen Chan
(74) *Attorney, Agent, or Firm* — Dorsey & Whitney LLP

(57) ABSTRACT

A rhythm game program for causing a computer to implement a function of controlling a progress of a rhythm game by displaying a trigger object, the program causing the computer to implement: an evaluation function of evaluating an operation input, based on a timing of the operation input for the trigger object and an operation timing associated with data; and an object control function of moving at least one of the trigger object and the operation position such that a distance between the trigger object and the operation position decreases, based on the operation timing, wherein the object control function implements a function of, when the trigger object for which the operation input has been performed satisfies a first condition, moving the trigger object to a predetermined position where the distance increases, and moving at least one of the trigger object and the operation position such that the distance decreases again.

10 Claims, 17 Drawing Sheets

(58) Field of Classification Search
USPC .......................................................... 463/31
See application file for complete search history.

(56) References Cited

U.S. PATENT DOCUMENTS

| | | | | |
|---|---|---|---|---|
| 7,435,169 | B2* | 10/2008 | Ozaki | A63F 13/00 463/7 |
| 2003/0109298 | A1* | 6/2003 | Oishi | A63F 13/08 463/8 |
| 2008/0268949 | A1 | 10/2008 | Dell | |
| 2010/0137049 | A1* | 6/2010 | Epstein | A63F 13/5375 463/7 |
| 2011/0003638 | A1* | 1/2011 | Lee | A63F 11/0051 463/35 |
| 2013/0116047 | A1* | 5/2013 | Yamamoto | A63F 13/573 463/31 |
| 2014/0349760 | A1 | 11/2014 | Tarama et al. | |

FOREIGN PATENT DOCUMENTS

| | | |
|---|---|---|
| JP | 2007181538 A | 7/2007 |
| JP | 2013075149 A | 4/2013 |
| JP | 5469266 B1 | 2/2014 |
| JP | 5555361 B1 | 6/2014 |
| JP | 2014133150 A | 7/2014 |
| JP | 2014168572 A | 9/2014 |
| JP | 2016000171 A | 1/2016 |
| JP | 2019129971 A | 8/2019 |

OTHER PUBLICATIONS

Radio Hammer Station: Ride the rhythm and blow off the pervert guy! Pop and funky rhythm action, Octoba [online], Aug. 14, 2014, [Searched on Apr. 22, 2020], Internet, URL, https://octoba.net/archive/20140814-android-game-rhstation-353943.html.
English translation of JP Office Action for Application No. 2019-046936, dated Apr. 7, 2020.

* cited by examiner

FIG.15

VALID SETTING DATA

| 999, 1, 1 |
| 999, 1, 0 |
| 999, *, * |
| 999, *, * |

FIG.16

MANAGEMENT TABLE

| CHARACTER ID | OPERATION TIMING | CURRENT POSITION | HP |
|---|---|---|---|
| 001 | (001,0,0) | *,*,*** | 20 |
| 002 | (002,1,2) | *,*,*** | 500 |
| – | – | – | – |
| – | – | – | – |
| – | – | – | – |
| – | – | – | – |
| – | – | – | – |
| – | – | – | – |

RHYTHM GAME PROGRAM AND GAME SYSTEM

CROSS-REFERENCE TO RELATED APPLICATION

This application is based upon and claims the benefit of priority of the prior Japanese Patent Application No 2019-046936, filed on Mar. 14, 2019, the entire contents of which are incorporated herein by reference.

BACKGROUND OF THE INVENTION

1. Field of the Invention

The present invention relates to a rhythm game program and a game system.

2. Description of Related Art

In the music game (or rhythm game) system, an indicator sign (trigger object) is moved and displayed along the corresponding track so as to reach the operation position when the operation time (timing) comes, and a process of evaluating the operation input by the player is performed. Examples of music game systems may be found in Japanese Published Application No. JPH11151380, which is hereby incorporated by reference in its entirety for any purpose.

SUMMARY OF THE INVENTION

In the music game system as described above, the indicator sign basically moves at the same timing for the same music. Therefore, it is a problem to control the indicator sign so as to improve interest of the game such that the game is not monotonous.

The purpose of at least one embodiment of the present invention is to solve the deficiencies in the related art.

According to a non-limited viewpoint, a rhythm game program according to an embodiment of the present invention is a rhythm game program for causing a computer to implement a function of controlling a progress of a rhythm game by playing a music and displaying a trigger object on a display unit, the program causing the computer to implement: an evaluation function of evaluating an operation input, based on a timing of the operation input of an operation unit for the trigger object and an operation timing associated with data used for playing the music; and an object control function of moving at least one of the trigger object and an operation position such that a distance between the trigger object and the operation position decreases, based on the operation timing corresponding to the trigger object, wherein the object control function implements a function of, when the trigger object for which the operation input has been performed satisfies a first condition, moving the trigger object to a predetermined position where the distance increases, and moving at least one of the trigger object and the operation position such that the distance decreases again.

According to a non-limited viewpoint, a rhythm game program according to an embodiment of the present invention is a rhythm game program for causing a server device connected to a game terminal device that executes a rhythm game through a communication network to control a progression of the rhythm game, by playing a music and displaying a trigger object on a display unit, the program causing the server device to implement: an evaluation function of evaluating an operation input, based on a timing of the operation input of an operation unit for the trigger object and an operation timing associated with data used for playing the music; and an object control function of moving at least one of the trigger object and the operation position such that a distance between the trigger object and the operation position decreases, based on the operation timing corresponding to the trigger object, wherein the object control function implements a function of, when the trigger object for which the operation input has been performed satisfies a first condition, moving the trigger object to a predetermined position where the distance increases, and moving at least one of the trigger object and the operation position such that the distance decreases again.

According to a non-limited viewpoint, a game system according to an embodiment of the present invention is a game system including a game terminal device which executes a rhythm game by playing a music and displaying a trigger object on a display unit, and a server device connected to the game terminal device through a communication network, the game system including: an evaluation controller configured to evaluate an operation input, based on a timing of the operation input of an operation unit for the trigger object and an operation timing associated with data used for playing the music; and an object controller configured to move at least one of the trigger object and the operation position such that a distance between the trigger object and the operation position decreases, based on the operation timing corresponding to the trigger object, wherein the object controller, when the trigger object for which the operation input has been performed satisfies a first condition, moves the trigger object to a predetermined position where the distance increases, and moves at least one of the trigger object and the operation position such that the distance decreases again.

Each embodiment of the present application solves one or more deficiencies.

BRIEF DESCRIPTION OF THE DRAWINGS

FIG. 15 is a diagram showing an example of valid setting data corresponding to at least one of the embodiments of the present invention.

FIG. 16 is a diagram showing an example of a management table corresponding to at least one of the embodiments of the present invention.

DESCRIPTION OF EMBODIMENTS

Examples of embodiments of the present invention will be described below with reference to the drawings. Various constituent elements in the examples of embodiments described below can be appropriately combined within a range in which no contradiction occurs. Further, the contents described as an example of a certain embodiment may not be described in other embodiments. Further, the contents of operations and processes not related to the characteristic part of each embodiment may be omitted. Further, the order of various processes constituting the various flows described below is in no particular order as long as no contradiction occurs in the processing contents.

First Embodiment

Figure 1:
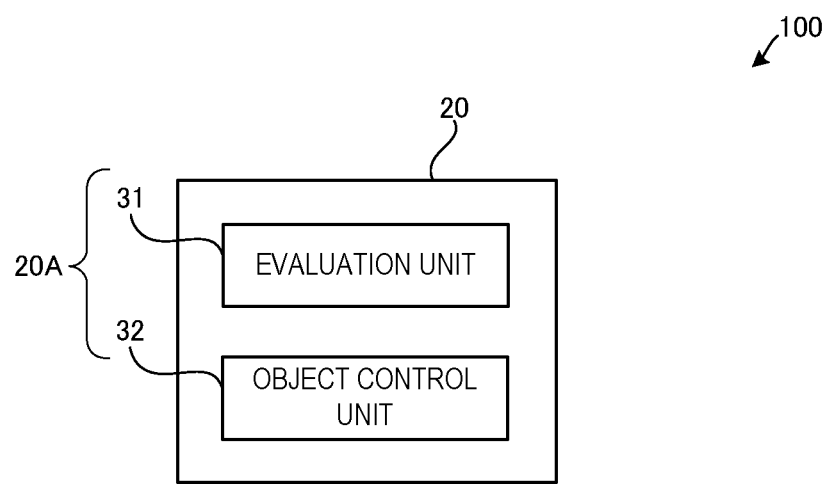
FIG. 1 is a block diagram showing a configuration example of a game system corresponding to at least one of embodiments of the present invention.

FIG. 1 is a block diagram showing a configuration example of a game system 100 corresponding to at least one of embodiments of the present invention. As shown in FIG. 1, the game system 100 includes a single terminal device (game terminal device) 20 used by a user (player) who plays a rhythm game (music video game). In FIG. 1, a configuration of a terminal device 20A that is an example of the configuration of the terminal device 20 is shown. The configuration of the game system 100 is not limited to the above configuration, and may be a configuration where the terminal device of a user is connected to the server device (video game processing server) via a communication network, and the server device provides a video game service to the terminal device (see FIG. 3).

The game system 100 has various functions for executing a music video game, which is a rhythm game that plays music and displays a trigger object (indicator sign, notes) on the display unit of the terminal device 20. In the rhythm game of the example of the present embodiment, at least one of the trigger object and the operation position moves such that the distance between the trigger object and the operation position decreases. For example, the trigger object moves toward the operation position. Then, the user performs an operation input for the trigger object. Specifically, the user performs an operation input at the timing when the trigger object reaches the operation position. Evaluation is performed on this operation input. The operation is input by using the operation unit of the terminal device 20.

Further, in the rhythm game of the example of the present embodiment, when the user performs an operation input on the trigger object, the trigger object may be backed. Specifically, when the trigger object for which the operation input has been performed satisfies the first condition, the trigger object moves to a predetermined position where the distance between the trigger object and the operation position increases. Thereafter, at least one of the trigger object and the operation position moves such that the distance decreases again. For example, when an operation input for the trigger object that has reached the operation position is made and thus the first condition is established, the trigger object moves to a predetermined position. Thereafter, the trigger object moves again toward the operation position. When the trigger object reaches the operation position again, the operation input is requested again. Therefore, there are cases where the user is required to input an operation twice or more for one trigger object.

The first condition is a condition related to the trigger object, and various conditions can be applied. For example, the first condition may be that the user's object (attack object) succeeds in attacking the trigger object. In this case, when there is an operation input for the trigger object, the user's object may be caused to attack the trigger object. This implements the effect that the trigger object is backed (flies) by the attack. Further, for example, the first condition may be that the operation input for the trigger object is a predetermined evaluation.

The terminal device 20 is managed by a user who plays a game. The terminal device 20 is a terminal device capable of executing a video game such as a stationary game device, a personal computer, a mobile phone terminal, a personal digital assistants (PDA), and a mobile game device.

Further, the terminal device 20 includes an operation unit, a storage unit such as a hard disk drive, a control unit configured by a CPU that generates a game image by executing the game, and a display unit that displays the game image, in order to execute the rhythm game. However, since it is a general configuration, a detailed description is omitted. In the terminal device 20, software (rhythm game program) for executing a rhythm game and controlling the progress of the game is stored in the storage unit. The rhythm game program also includes game data such as data (music data) for playing music.

Next, the configuration of the terminal device 20A that is an example of the configuration of the terminal device 20 will be described. The terminal device 20A includes at least an evaluation unit 31 and an object control unit 32 for controlling the progress of the rhythm game by the control unit executing the rhythm game program stored in the storage unit.

The evaluation unit (evaluation function) 31 evaluates the operation input, based on the operation input timing of the operation unit for the trigger object and the operation timing associated with the data (music data) used for music playback. The operation timing is, for example, information that specifies a beat of the music at which the operation is to be input. For example, game data includes timing data (for example, see FIG. 11) in which a plurality of operation timings are set.

A general configuration may be used for the evaluation method. For example, in the evaluation period, the degree of coincidence between the user's operation input and the operation timing corresponding to the evaluation period is determined. A user's operation input may be evaluated based on the matching degree. The evaluation period means, for example, a predetermined period before and after one operation timing including the operation timing. That is, the evaluation is performed when the current playback position of the music overlaps a predetermined period before and after one operation timing including the operation timing.

The object control unit 32 (object control function) moves at least one of the trigger object and the operation position such that the distance between the trigger object and the operation position decreases, based on the operation timing corresponding to the trigger object. For example, the object control unit 32 causes a trigger object corresponding to an operation timing that comes after a predetermined time (for example, one measure) has elapsed from the current playback position of the music to appear at the arrangement position and move toward the operation position. In this case, the object control unit 32 moves the trigger object so as to reach the operation position, when the operation timing comes.

Further, when the trigger object for which the operation input has been performed satisfies the first condition, the object control unit 32 moves the trigger object to a movement position (predetermined position) where the distance between the trigger object and the operation position increases. Thereafter, the object control unit 32 moves at least one of the trigger object and the operation position such that the distance decreases again. For example, similarly to the example of the evaluation method described above, when there is a user's operation input in the evaluation period, it may be determined that there has been an operation input for the trigger object at the operation timing corresponding to the evaluation period. The predetermined position for moving the trigger object can be set to any position. For example, a predetermined position in a timing table or the like may be set as the predetermined position. Alternatively, a position returned by a predetermined distance from the current position may be set as the predetermined position.

Next, the operation of the game system 100 (system 100) of this embodiment will be described.

Figure 2:
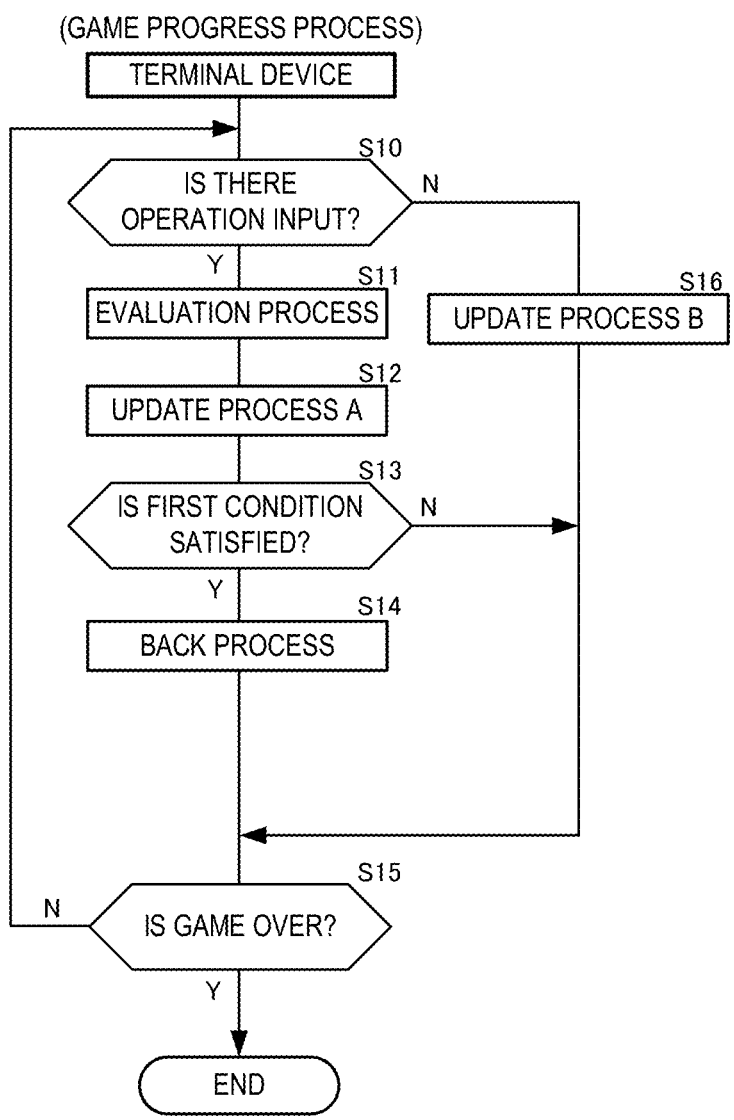
FIG. 2 is a flowchart showing an example of a game progress process corresponding to at least one of the embodiments of the present invention.

FIG. 2 is a flowchart illustrating an example of a game progress process executed by the system 100. In the game progress process, a process for progressing the game, such as a process for controlling the movement of the trigger object and an evaluation process, is performed. Hereinafter, a case where the terminal device 20A executes the game progress process will be described as an example. Note that FIG. 2 mainly shows a process for controlling the movement of the trigger object and an evaluation process, and a part of the other game progress processes is omitted.

The game progress process of this example is performed, for example, when there is an operation input for starting a game (music playback) by the user.

Note that the terminal device 20A generates a game image including an image of the game space in which the trigger object appears, at a predetermined timing (for example, every 1/60 seconds) in accordance with the processing result of the game progress process, during the execution of the game progress process, and displays the game image on a display screen.

The terminal device 20A determines whether or not there is an operation input (step S10). For example, as described above, it is determined whether or not there is an operation input in the evaluation period corresponding to one trigger object. The terminal device 20A may determine whether or not there is an operation input, based on the operation information received from the operation unit. When there is no operation input (step S10: NO), the terminal device 20A proceeds to the process of step S16.

On the other hand, when there is an operation input (step S10: YES), the terminal device 20A performs an evaluation process (step S11). In the evaluation process, for example, as described above, the user's operation input is evaluated based on the degree of coincidence between the user's operation input and the operation timing in the evaluation period, based on the timing data.

Next, the terminal device 20A performs an object update process A (step S12). In the update process A, the terminal device 20A updates the operation of the object in the game space. For example, the terminal device 20A causes the trigger object to appear at the arrangement position, based on each operation timing, and to move toward the operation position. Specifically, the terminal device 20A moves the trigger object from the arrangement position at a constant speed so as to reach the operation position when the operation timing comes. In addition, for example, the terminal device 20A moves the trigger object that has been set to move back in the back process described later to a predetermined position. After the movement, the back setting may be canceled and the trigger object may be moved again toward the operation position.

Thereafter, the terminal device 20A determines whether or not the first condition is satisfied (step S13). That is, based on the update result in the update process A, the terminal device 20A determines whether or not one trigger object for which the operation input has been performed satisfies the first condition. When the first condition is not satisfied (step S13: NO), the terminal device 20A proceeds to the process of step S15.

On the other hand, when the first condition is satisfied (step S13: YES), the terminal device 20A performs a back process (step S14). In the back process, as described above, a process for moving one trigger object for which the operation input has been performed to a predetermined position is performed. For example, a back setting is made for this trigger object. Specifically, information for returning to a predetermined position is associated with the identification information of the trigger object and stored in the storage unit. Thereafter, the terminal device 20A proceeds to the process of step S15.

Returning to the process of step S10, when it is determined that there is no operation input, the terminal device 20A executes an object update process B (step S16). In the update process B, the same process as the above-described update process A is performed, but the process related to the one trigger object for which the operation input has been performed as in the update process A is not performed. For example, in the update process B, a process of causing the trigger object for which the evaluation period has passed without any operation input to disappear from the game space is performed.

Thereafter, the terminal device 20A determines whether or not the game is over (step S15). For example, the terminal device 20A may determine that the game is over when the playback of the music is ended. When the game is not over (step S15: NO), the terminal device 20A returns to the process of step S10. On the other hand, when the game is over (step S15: YES), the terminal device 20A ends the game progress process.

As described above, as one aspect of the first embodiment, since the terminal device 20A includes the evaluation unit 31 and the object control unit 32, when the first condition is established, the trigger object for which the operation input has been performed moves to a predetermined position, and the distance between the trigger object and the operation position decreases again. Therefore, the game is not monotonous and interest of the game is improved.

Figure 3:
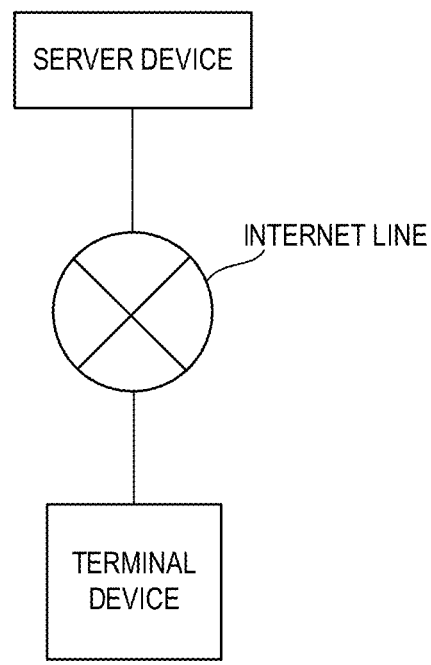
FIG. 3 is a block diagram showing a configuration example of a game system corresponding to at least one of embodiments of the present invention.

In the example of the first embodiment described above, the terminal device 20A executes the game program to control the progress of the game, but the configuration is not particularly limited thereto. For example, a game system including a server device and a terminal device as shown in FIG. 3 may be used, and the server device may include at least the evaluation unit 31 and the object control unit 32 instead of the terminal device 20A.

The server device includes a storage unit such as a hard disk drive (not shown), a control unit configured with a CPU, and the like. Further, the server device controls the progress of the video game in the same manner as the terminal device 20A, by the control unit executing the above-described game program stored in the storage unit. The server device includes a general configuration for controlling the progress of the video game, such as a control unit and a communication unit, but a detailed description thereof is omitted here.

The server device does not execute a video game as the terminal device 20A. The server device includes, for example, a communication unit connected to the Internet line (communication network), and communicates with a terminal device that executes a video game. The server device receives an operation signal (operation information) or the like from the user (terminal device), and transmits information (image information or the like) related to the game progress to the terminal device. A plurality of server devices may cooperate to execute the game program, and the server device and terminal device may cooperate to execute the rhythm game program (control the progress of the game).

Figure 4:
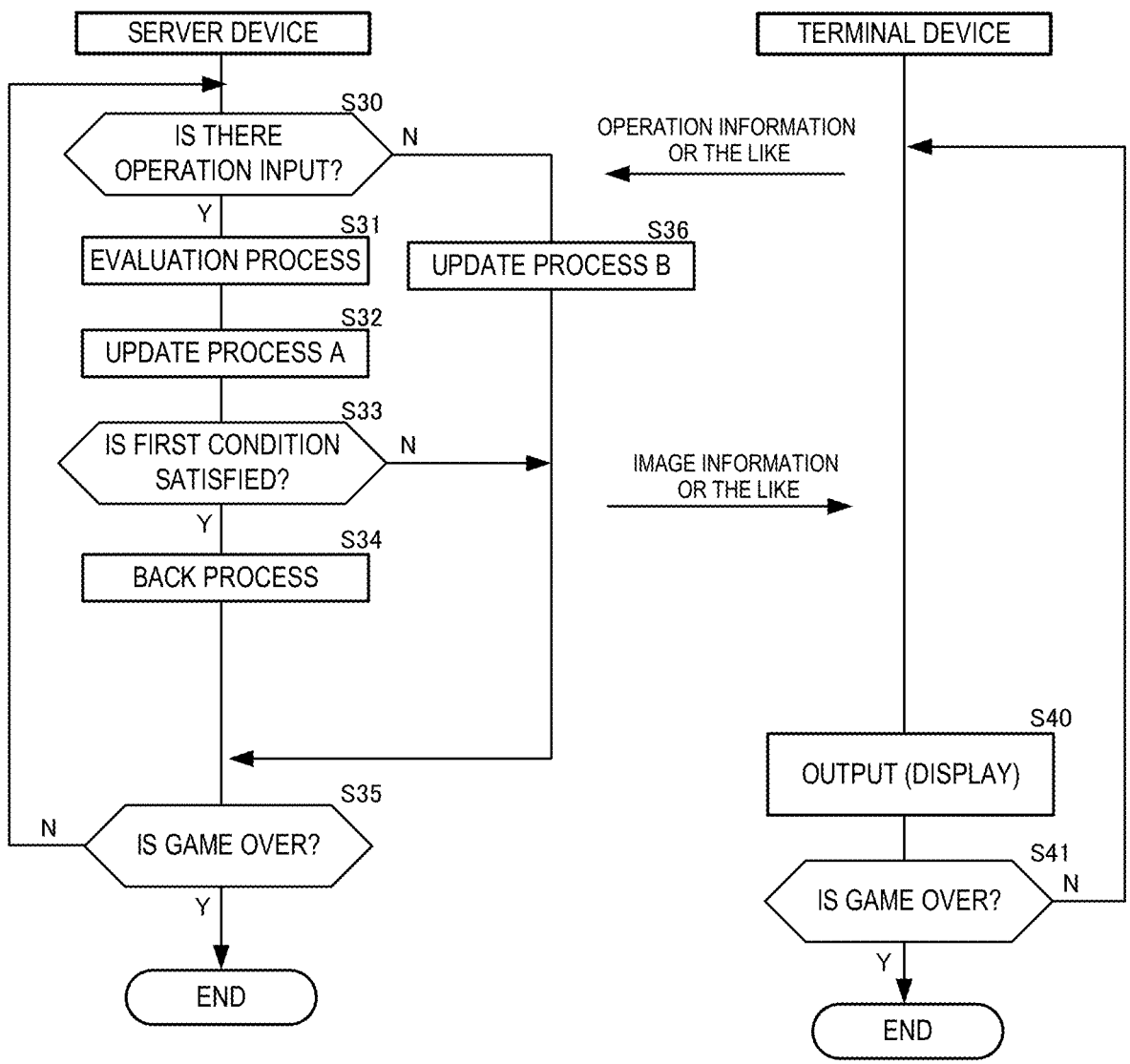
FIG. 4 is a flowchart showing an example of operations of a server device and a terminal device when the server device corresponding to at least one of the embodiments of the present invention executes a game progress process.

FIG. 4 is a flowchart showing an example of operations of a server device and a terminal device when the server device executes the game progress process shown in FIG. 2.

The terminal device periodically transmits the operation information of the operation unit by the user together with the user identification information. The server device executes each process for each user (identification information).

The server device determines whether or not there is an operation input (step S30). For example, as described above, it is determined whether or not there is an operation input in the evaluation period corresponding to one trigger object. The server device may determine whether or not there is a request for operation input, based on the received operation information. When there is no operation input (step S30: NO), the server device proceeds to the process of step S36.

On the other hand, when there is an operation input (step S30: YES), the server device performs an evaluation process (step S31). Next, the server device performs the object update process A (step S32). In the update process, the server device updates the operation of the object in the game space.

Thereafter, the server device determines whether or not the first condition is satisfied (step S33). When the first condition is not satisfied (step S33: NO), the server device proceeds to the process of step S35.

On the other hand, when the first condition is satisfied (step S33: YES), the server device performs a back process (step S34). In the back process, as described above, a process for moving one trigger object for which the operation input has been performed to a predetermined position is performed. For example, a back setting is made for this trigger object. Specifically, information for returning to a predetermined position is associated with the identification information of the trigger object and stored in the storage unit of the server device. Thereafter, the server device proceeds to the process of step S35.

Returning to the process of step S30, when it is determined that there is no operation input, the server device executes the object update process B (step S36). In the update process B, the same process as the above-described update process A is performed, but the process related to the one trigger object for which the operation input has been performed as in the update process A is not performed.

Thereafter, the server device determines whether or not the game is over (step S35). When the game is not over (step S35: NO), the server device returns to the process of step S30. On the other hand, when the game is over (step S35: YES), the server device ends the game progress process.

Further, the server device periodically transmits image information and the like for generating a game image corresponding to the game progress in the game progress process to the terminal device. Until the game ends (step S41: YES), the terminal device outputs (displays on the display unit) a game image based on the received image information (step S40).

Note that the above-described "trigger object" means an object that notifies the user of operation timing when the user inputs an operation. Any configuration can be adopted as the form of the trigger object. For example, there are disks, rings, characters, items, and the like. There may be a plurality of types of trigger objects. For example, a trigger object that moves to a predetermined position when the first condition is established and a trigger object that does not move to a predetermined position regardless of whether the first condition is established may be provided, so various forms of trigger objects may be made different.

Further, any number of times can be adopted as the number of times that one trigger object moves to a predetermined position (the number of possible movements). Note that the operation input for the trigger object that has moved to the predetermined position may not be evaluated. In the case of not performing the evaluation, for example, when an operation input is made for the trigger object that has moved to a predetermined position and reached the operation position again, an item that is usable in the game may be provided to the user.

The "operation position" described above is a position where an operation input is made for the trigger object. The operation position may not be displayed on the display unit. In the case of hiding, for example, a guide marker (see FIGS. 13A to 13D) for notifying that the trigger object is approaching the operation position may be displayed. The operation position may be provided separately for each trigger object.

The above-described "operation unit" may employ an operation unit of any configuration as long as the user can operate it. Examples of the operation unit include a game controller (game pad) provided with a plurality of buttons (operators), a touch panel disposed on a display screen, and the like.

In the example of the above-described embodiment, the configuration in which the trigger object is moved toward the operation position is illustrated, but the configuration is not particularly limited thereto. The operation position may move toward the trigger object. Alternatively, the trigger object and the operation position may move with respect to each other.

The movement of the trigger object and the operation position of the above-described embodiment may be performed along the movement path, for example. In this case, the movement path may be a fixed route connecting the trigger object and the operation position, or may be a randomly formed route connecting the trigger object and the operation position.

Second Embodiment

Figure 5:
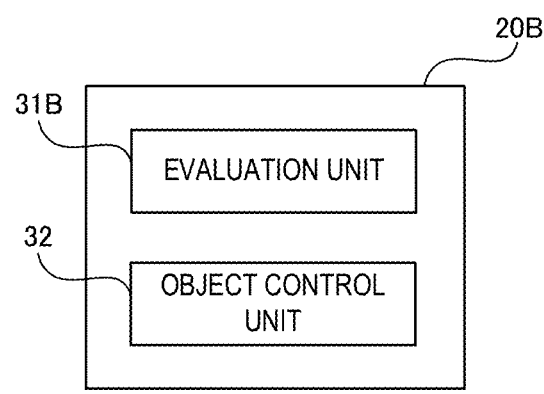
FIG. 5 is a block diagram showing a configuration of a terminal device corresponding to at least one of embodiments of the present invention.

FIG. 5 is a block diagram illustrating a configuration of a terminal device 20B that is an example of the terminal device 20. In the example of the present embodiment, the terminal device 20B includes at least an evaluation unit 31B and an object control unit 32.

The evaluation unit 31B evaluates the operation input, based on the operation input timing of the operation unit for the trigger object and the operation timing associated with the data (music data) used for music playback. The operation timing is, for example, information that specifies a beat of the music at which the operation is to be input. For example, game data includes timing data (for example, see FIG. 11) in which a plurality of operation timings are set.

In the example of the present embodiment, the evaluation unit 31B also evaluates the operation input for the trigger object after the movement to a predetermined position. That is, the user's operation input for one trigger object may be evaluated a plurality of times. For example, when the trigger object first reaches the operation position, the user's operation input is evaluated (first evaluation). Thereafter, when the first condition is established, and thus, the trigger object moves to the movement position (predetermined position) and reaches the operation position again, the user's re-operation input is evaluated (second evaluation).

The object control unit 32 moves at least one of the trigger object and the operation position such that the distance between the trigger object and the operation position decreases, based on the operation timing corresponding to the trigger object. Further, when the trigger object for which the operation input has been performed satisfies the first condition, the object control unit 32 moves the trigger object to a movement position (predetermined position) where the distance between the trigger object and the operation position increases. Thereafter, the object control unit 32 moves at least one of the trigger object and the operation position such that the distance decreases again.

Next, the operation of the game system 100 (system 100) of this embodiment will be described.

Figure 6:
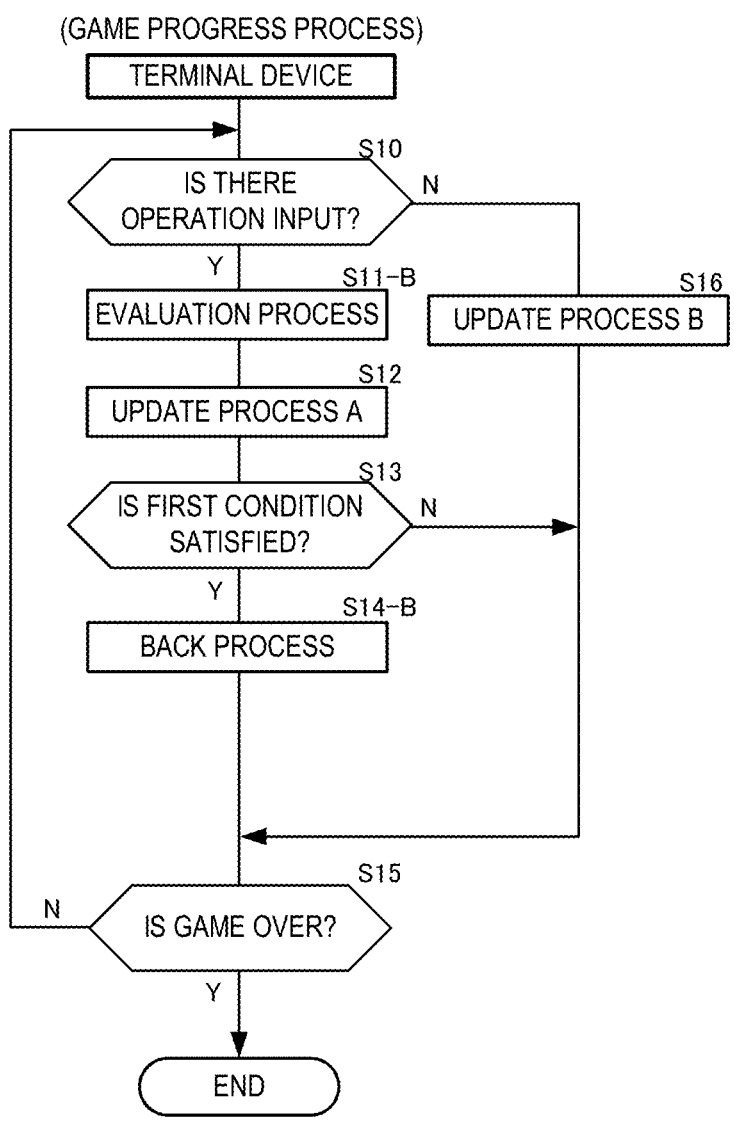
FIG. 6 is a flowchart showing an example of a game progress process corresponding to at least one of the embodiments of the present invention.

FIG. 6 is a flowchart illustrating an example of a game progress process executed by the system 100. In the game progress process, a process for progressing the game, such as a process for controlling the movement of the trigger object and an evaluation process, is performed. Hereinafter, a case where the terminal device 20B executes the game progress process will be described as an example. Note that FIG. 6 mainly shows a process for controlling the movement of the trigger object and an evaluation process, and a part of the other game progress processes is omitted. The flowchart showing the operation of the server device is omitted from the viewpoint of avoiding redundant explanation.

The game progress process of this example is performed, for example, when there is an operation input for starting a game (music playback) by the user.

Note that the terminal device 20B generates a game image including an image of the game space in which the trigger object appears, at a predetermined timing (for example, every 1/60 seconds) in accordance with the processing result of the game progress process, during the execution of the game progress process, and displays the game image on a display screen.

The terminal device 20B determines whether or not there is an operation input (step S10). For example, as described above, it is determined whether or not there is an operation input in the evaluation period corresponding to one trigger object. Further, the terminal device 20A may determine whether or not there is an operation input, based on the operation information received from the operation unit. When there is no operation input (step S10: NO), the terminal device 20B proceeds to the process of step S16.

On the other hand, when there is an operation input (step S10: YES), the terminal device 20B performs an evaluation process (step S11-B). In the evaluation process, for example, as described above, the user's operation input is evaluated based on the degree of coincidence between the user's operation input and the operation timing in the evaluation period, based on the timing data. Further, in the evaluation process of the example of the present embodiment, the valid setting to be described later is also referred to, and the operation input for the trigger object after the movement to a predetermined position is also evaluated.

Next, the terminal device 20B performs the object update process A (step S12). In the update process A, the terminal device 20B updates the operation of the object in the game space. For example, the terminal device 20B causes the trigger object to appear at the arrangement position, based on each operation timing, and to move toward the operation position. Specifically, the terminal device 20B moves the trigger object from the arrangement position at a constant speed so as to reach the operation position when the operation timing comes. In addition, for example, the terminal device 20B moves the trigger object that has been set to move back in the back process described later to a predetermined position. After the movement, the back setting may be canceled and the trigger object may be moved again toward the operation position.

Thereafter, the terminal device 20B determines whether or not the first condition is satisfied (step S13). That is, based on the update result in the update process A, the terminal device 20B determines whether or not the trigger object for which the operation input has been performed satisfies the first condition. When the first condition is not satisfied (step S13: NO), the terminal device 20B proceeds to the process of step S15.

On the other hand, when the first condition is satisfied (step S13: YES), the terminal device 20B performs a back process (step S14-B). In the back process, as described above, a process for moving the trigger object for which the operation input has been performed to a predetermined position is performed. For example, a back setting is made for this trigger object. Specifically, information for returning to a predetermined position is associated with the identification information of the trigger object and stored in the storage unit.

Further, in the back process of the example of the present embodiment, a setting for enabling the operation timing corresponding to the trigger object to return to the predetermined position is performed (valid setting). Note that when the trigger object does not return to the predetermined position, this operation timing is not an evaluation target because this operation timing is not valid. Thereafter, the terminal device 20B proceeds to the process of step S15.

Returning to the process of step S10, when it is determined that there is no operation input, the terminal device 20B executes the object update process B (step S16). In the update process B, the same process as the above-described update process A is performed, but the process related to the one trigger object for which the operation input has been performed as in the update process A is not performed. For example, in the update process B, a process of causing the trigger object for which the evaluation period has passed without any operation input to disappear from the game space is performed.

Thereafter, the terminal device 20B determines whether or not the game is over (step S15). When the game is not over (step S15: NO), the terminal device 20B returns to the process of step S10. On the other hand, when the game is over (step S15: YES), the terminal device 20B ends the game progress process.

As described above, as one aspect of the second embodiment, since the terminal device 20B includes the evaluation unit 31B and the object control unit 32, when the first condition is established, the trigger object for which the operation input has been performed moves to a predetermined position, and the distance between the trigger object and the operation position decreases again. Therefore, the game does not move monotonously, and interest of the game is improved.

Further, since the operation input for the trigger object after the movement to the predetermined position is also evaluated, for example, when the score based on the evaluation is calculated, the score can be increased as the trigger object moves to the predetermined position. Therefore, in order to aim for a high score, it becomes a motivation to input an operation also to the trigger object that has moved to a predetermined position, and interest of the game is further improved.

Note that the above-described valid setting of the operation timing may be performed with reference to timing data in which the operation timing is set, for example. Specifically, an operation timing when the first condition is established and the trigger object moves to a predetermined position is set in advance in the timing data. The setting which validates the above operation timing may be performed. That is, the information specifying the operation timing and the information indicating that it is valid may be stored in the storage unit in association with each other (for example, see FIG. 15).

In the example of the above-described embodiment, the configuration in which the trigger object is moved toward the operation position is illustrated, but the configuration is not particularly limited thereto. The operation position may move toward the trigger object. Alternatively, the trigger object and the operation position may move with respect to each other.

The movement of the trigger object and the operation position of the above-described embodiment may be performed along the movement path, for example. In this case, the movement path may be a fixed route connecting the trigger object and the operation position, or may be a randomly formed route connecting the trigger object and the operation position.

Third Embodiment

Figure 7:
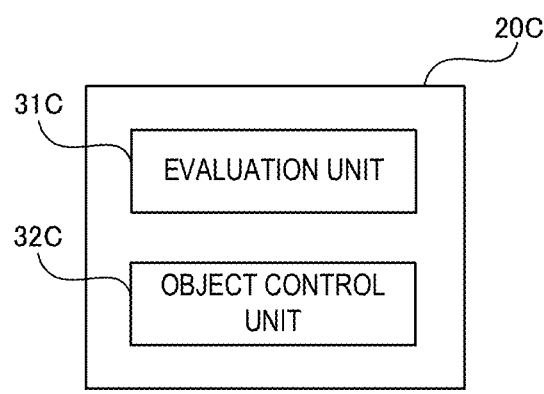
FIG. 7 is a block diagram showing a configuration of a terminal device corresponding to at least one of embodiments of the present invention.

FIG. 7 is a block diagram illustrating a configuration of a terminal device 20C that is an example of the terminal device 20. In the example of the present embodiment, the terminal device 20C includes at least an evaluation unit 31C and an object control unit 32C.

In the example of the present embodiment, when a trigger object for which an operation input is performed satisfies the second condition, a substitute object for the trigger object is disposed at a predetermined position. Thereafter, at least one of the substitute object and the operation position is moved such that the distance between the substitute object and the operation position decreases again. The substitute object is an object having a form different from that of the trigger object, but is a trigger object that notifies of the operation timing. That is, the substitute object means an object that is alternatively disposed at the movement position (predetermined position) where the trigger object is to move.

In addition, when the trigger object for which the operation input has been performed satisfies the first condition, the trigger object moves to a predetermined position as in the first embodiment described above. That is, the second condition is a condition different from the first condition.

The second condition is a condition related to the trigger object, and various conditions can be applied as long as they are different from the first condition. For example, regarding the case where the user's object (attack object) exists and the vitality (HP) is set in the trigger object, an example of the first condition and the second condition will be described.

In the above example, the first condition includes that the trigger object for which the operation input has been performed is attacked, and the vitality of the trigger object is equal to or greater than a predetermined value (for example, HP=1). That is, when the trigger object is attacked by the user's object but the trigger object is not unable to fight, the trigger object returns to a predetermined position.

The second condition includes that the trigger object for which the operation input has been performed is attacked, and the vitality of the trigger object is less than a predetermined value (HP=1). That is, when the trigger object is attacked by the user's object and becomes unable to fight, the trigger object disappears, and the substitute object is disposed at a predetermined position.

The evaluation unit 31C evaluates the operation input, based on the operation input timing of the operation unit for the trigger object and the operation timing associated with the data (music data) used for music playback. The operation timing is, for example, information that specifies a beat of the music at which the operation is to be input. For example, game data includes timing data (for example, see FIG. 11) in which a plurality of operation timings are set.

In the example of the present embodiment, the evaluation unit 31C also evaluates the operation input for the trigger object after the movement to a predetermined position. That is, the user's operation input for one trigger object may be evaluated a plurality of times. For example, when the trigger object first reaches the operation position, the user's operation input is evaluated (first evaluation). Thereafter, when the first condition is established, and thus, the trigger object moves to the movement position (predetermined position) and reaches the operation position again, the user's re-operation input is evaluated (second evaluation).

Further, in the example of the present embodiment, the evaluation unit 31C also evaluates the operation input for the substitute object. Since the operation timing corresponding to the substitute object is the same as the operation timing when the trigger object moves to the movement position (predetermined position), the evaluation is performed in the same manner.

The object control unit 32C moves at least one of the trigger object and the operation position such that the distance between the trigger object and the operation position decreases, based on the operation timing corresponding to the trigger object. Further, when the trigger object for which the operation input has been performed satisfies the first condition, the object control unit 32C moves the trigger object to a movement position (predetermined position) where the distance between the trigger object and the operation position increases. Thereafter, the object control unit 32C moves at least one of the trigger object and the operation position such that the distance decreases again. Further, when the trigger object for which the operation input has been performed satisfies the second condition, the object control unit 32C disposes the substitute object for the trigger object to a movement position (predetermined position). Thereafter, the object control unit 32C moves at least one of the substitute object and the operation position such that the distance between the substitute object and the operation position decreases.

Next, the operation of the game system 100 (system 100) of this embodiment will be described.

Figure 8:
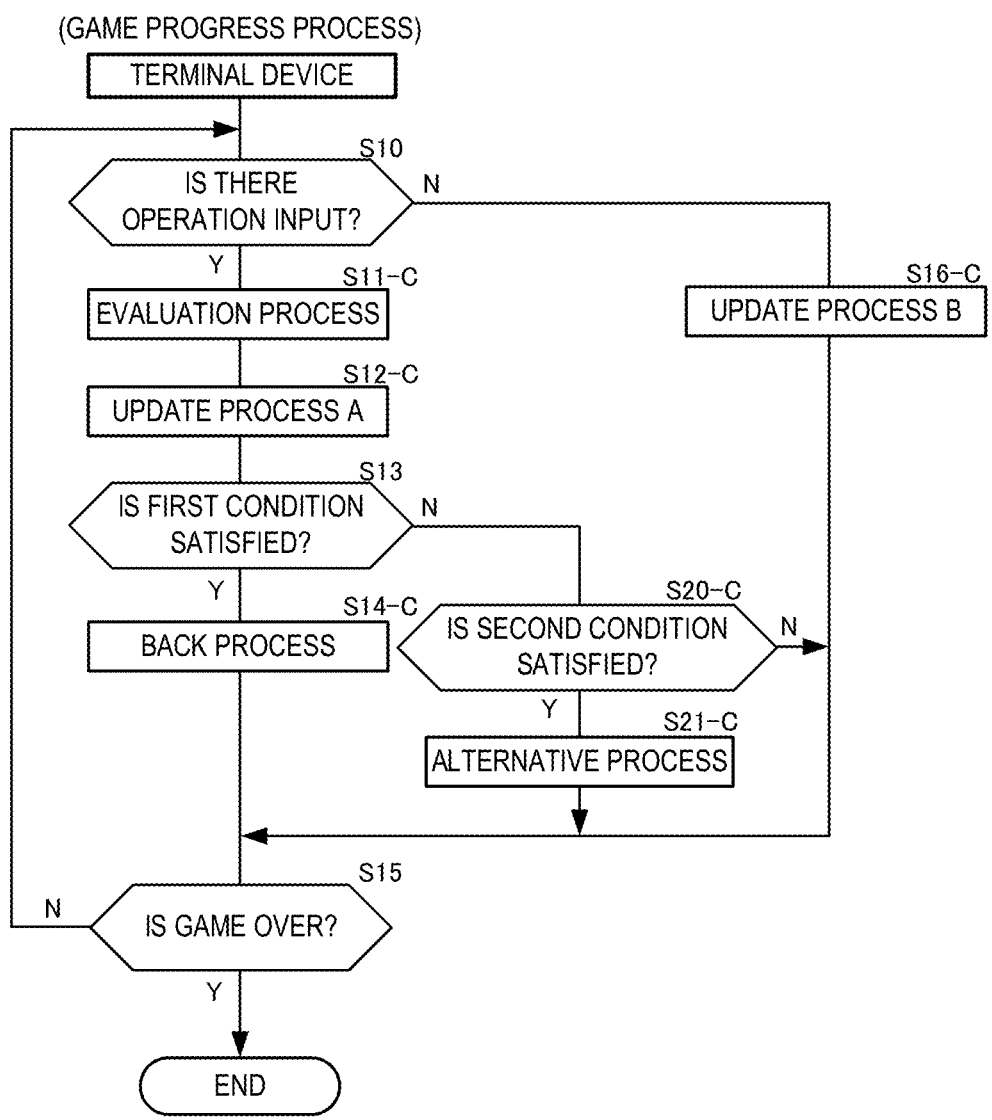
FIG. 8 is a flowchart showing an example of a game progress process corresponding to at least one of the embodiments of the present invention.

FIG. 8 is a flowchart illustrating an example of a game progress process executed by the system 100. In the game progress process, a process for progressing the game, such as a process for controlling the movement of the trigger object and an evaluation process, is performed. Hereinafter, a case where the terminal device 20C executes the game progress process will be described as an example. Note that FIG. 8 mainly shows a process for controlling the movement of the trigger object and an evaluation process, and a part of the other game progress processes is omitted. The flowchart showing the operation of the server device is omitted from the viewpoint of avoiding redundant explanation.

The game progress process of this example is performed, for example, when there is an operation input for starting a game (music playback) by the user.

Note that the terminal device 20C generates a game image including an image of the game space in which the trigger object appears, at a predetermined timing (for example, every 1/60 seconds) in accordance with the processing result of the game progress process, during the execution of the game progress process, and displays the game image on a display screen.

The terminal device 20C determines whether or not there is an operation input (step S10). For example, as described above, it is determined whether or not there is an operation input in the evaluation period corresponding to one trigger object. Further, the terminal device 20C may determine whether or not there is an operation input, based on the operation information received from the operation unit. When there is no operation input (step S10: NO), the terminal device 20C proceeds to the process of step S16.

On the other hand, when there is an operation input (step S10: YES), the terminal device 20C performs an evaluation process (step S11-C). In the evaluation process, for example, as described above, the user's operation input is evaluated based on the degree of coincidence between the user's operation input and the operation timing in the evaluation period, based on the timing data. Further, in the evaluation process of the example of the present embodiment, the valid setting described above is also referred to, and the operation inputs to the trigger object and the substitute object after the movement to a predetermined position are also evaluated.

Next, the terminal device 20C performs an object update process A (step S12-C). In the update process A, the terminal device 20C updates the operation of the object in the game space. For example, the terminal device 20C causes the trigger object to appear at the arrangement position, based on each operation timing, and to move toward the operation position. Specifically, the terminal device 20C moves the trigger object from the arrangement position at a constant speed so as to reach the operation position when the operation timing comes. In addition, for example, the terminal device 20C moves the trigger object that has been set to move back in the back process described later to a predetermined position. After the movement, the back setting may be canceled and the trigger object may be moved again toward the operation position. Further, the terminal device 20C causes a substitute object, which is added as an object to appear in the game space in an alternative process described later, to appear at a predetermined position. For example, the terminal device 20C moves the substitute object after appearance toward the operation position.

Thereafter, the terminal device 20C determines whether or not the first condition is satisfied (step S13). That is, based on the update result in the update process A, the terminal device 20C determines whether or not the trigger object for which the operation input has been performed satisfies the first condition.

When the first condition is satisfied (step S13: YES), the terminal device 20C performs a back process (step S14-C). In the back process, as in the second embodiment, a process for moving the trigger object for which the operation input has been performed to a predetermined position is performed. For example, a back setting is made for this trigger object. Specifically, information for returning to a predetermined position is associated with the identification information of the trigger object and stored in the storage unit.

Further, in the back process of the example of the present embodiment, as in the second embodiment, a setting for enabling the operation timing corresponding to the trigger object to return to the predetermined position is performed (valid setting). Note that when the trigger object does not return to the predetermined position and the substitute object is not disposed at the predetermined position, this operation timing is not an evaluation target because this operation timing is not valid. Thereafter, the terminal device 20C proceeds to the process of step S15.

On the other hand, when the first condition is not satisfied (step S13: NO), the terminal device 20C determines whether or not the second condition is satisfied (step S20-C). That is, based on the update result in the update process A, the terminal device 20C determines whether or not the trigger object for which the operation input has been performed satisfies the second condition. When the second condition is not satisfied (step S20-C: NO), the terminal device 20C proceeds to the process of step S15.

On the other hand, when the second condition is satisfied (step S20-C: YES), the terminal device 20C performs an alternative process (step S21-C). In the alternative process, a process for disposing the substitute object, instead of the trigger object for which the operation input has been performed, at the predetermined position is performed. For example, a setting is made such that a new substitute object appears in the game space. Specifically, information for disposing at a predetermined position associated with the identification information of the substitute object may be additionally stored in the storage unit as information about an object that appears in the game space.

In the alternative process, as in the back process of step S14-C, a setting for enabling the operation timing corresponding to the substitute object disposed at a predetermined position is performed (valid setting). Thereafter, the terminal device 20C proceeds to the process of step S15.

Returning to the process of step S10, when it is determined that there is no operation input, the terminal device 20C executes the object update process B (step S16-C). In the update process B, the same process as the above-described update process A is performed, but the process related to the one trigger object for which the operation input has been performed as in the update process A is not performed. For example, in the update process B, a process of causing the trigger object for which the evaluation period has passed without any operation input to disappear from the game space is performed.

Thereafter, the terminal device 20C determines whether or not the game is over (step S15). When the game is not over (step S15: NO), the terminal device 20C returns to the process of step S10. On the other hand, when the game is over (step S15: YES), the terminal device 20C ends the game progress process.

As described above, as one aspect of the third embodiment, since the terminal device 20C includes the evaluation unit 31C and the object control unit 32C, when the first condition is established, the trigger object for which the operation input has been performed moves to a predetermined position, and the distance between the trigger object and the operation position decreases again. Therefore, the game does not move monotonously, and interest of the game is improved.

In addition, when the second condition is established, the substitute object is disposed at a predetermined position. That is, depending on the conditions, another object appears from the trigger object. Therefore, the game does not move monotonously, and interest of the game is further improved.

Further, the operation inputs to the trigger object and the substitute object after the movement to a predetermined position are also evaluated. Therefore, for example, when a score based on the evaluation is calculated, the score may increase as the trigger object and the substitute object are disposed at predetermined positions. Therefore, in order to aim for a high score, it becomes a motivation to input an operation also to the trigger object and substitute object disposed at a predetermined position, and interest of the game is further improved. In addition, even when the first condition is not satisfied, when the second condition is satisfied, the operation timing increases, so the opportunity for increasing the operation timing increases.

In the example of the above-described embodiment, the configuration in which the trigger object is moved toward the operation position is illustrated, but the configuration is not particularly limited thereto. The operation position may move toward the trigger object. Alternatively, the trigger object and the operation position may move with respect to each other.

The movement of the trigger object and the operation position of the above-described embodiment may be performed along the movement path, for example. In this case, the movement path may be a fixed route connecting the trigger object and the operation position, or may be a randomly formed route connecting the trigger object and the operation position.

Fourth Embodiment

Figure 9:
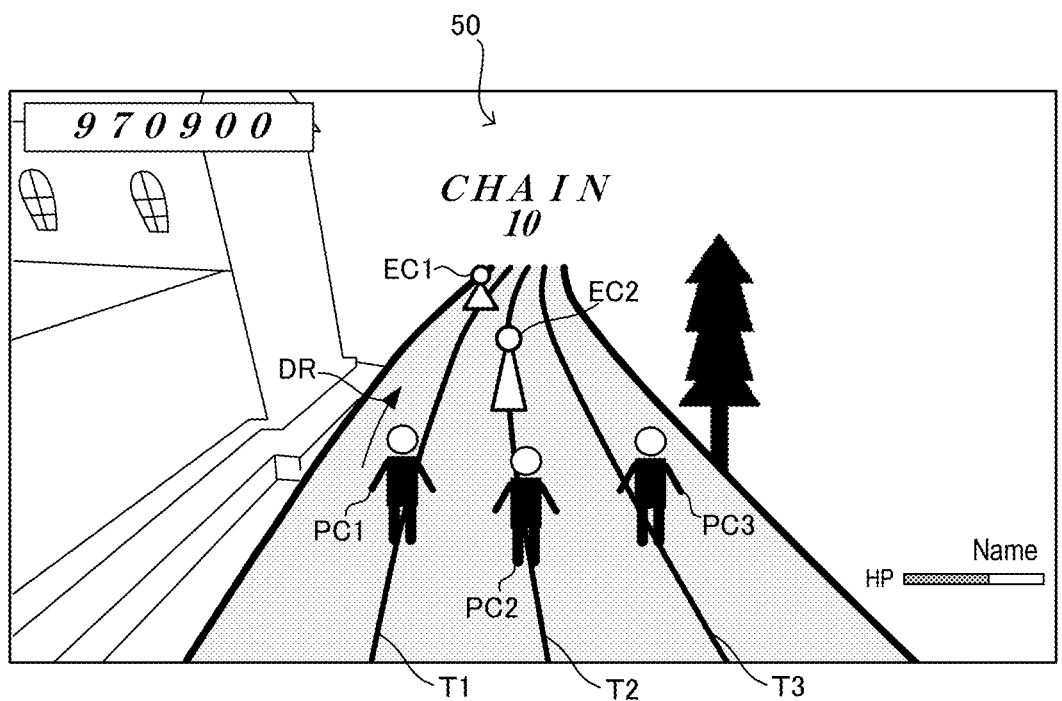
FIG. 9 is a diagram showing an example of a game image corresponding to at least one of the embodiments of the present invention.

FIG. 9 is a diagram illustrating an example of the game image according to the present exemplary embodiment. The terminal device 20D of the example of the present embodiment is a stationary game device having a communication function for communicating with other terminal devices via a communication network such as the Internet. The terminal device 20D includes an operation unit (not shown) that is a game controller (game pad) having a plurality of buttons (operators). The terminal device 20D includes a display unit that is a liquid crystal display device.

The terminal device 20D executes the rhythm game program stored in the storage unit to display a game image as shown in FIG. 9 on the display unit (display screen) and provide the user with a rhythm game (game). The game image includes an image of the game space 50 imaged from the back side of the three party characters PC (PC1 to PC3) that are users' companions. The game space 50 is a three-dimensional virtual space. In the game space 50, enemy characters ECs (EC1, EC2), which are trigger objects, also appear as the music playback progresses. The enemy character EC notifies of the timing when the user presses the button of the game controller.

In the game of the example of the present embodiment, the user performs an operation input for a trigger object such as the enemy character EC, and evaluation ("EXCELLENT", "GOOD", "MISS", or the like) is performed for the operation input. Further, the party character PC attacks the enemy character EC in response to the operation input. The enemy character EC becomes unable to fight and disappears due to the damage caused by the attack. The party character PC corresponds to an attack character.

In the game space 50, there are movement paths T (T1 to T3) of the party characters PC1 to PC3. As the music playback progresses, the party characters PC1 to PC3 respectively move on the movement paths T1 to T3 at the same constant speed. The moving direction DR of each of the party characters PC1 to PC3 is a direction from the front to the back of the game space 50 illustrated in FIG. 9. The enemy characters ECs (EC1, EC2) appear on the movement paths T1 to T3.

In the example of the present embodiment, an operation input for the enemy character EC on the movement paths T1 and T3 is made by the same button A (not shown) provided on the game controller. Further, an operation input for the enemy character EC on the movement path T2 is made by a button B (not shown) different from the button A.

Figure 10A:
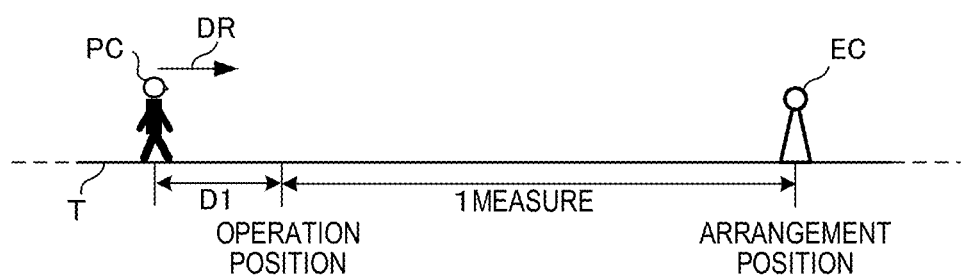
FIGS. 10A and 10B are diagrams showing a game space corresponding to at least one of the embodiments of the present invention.
Figure 10B:
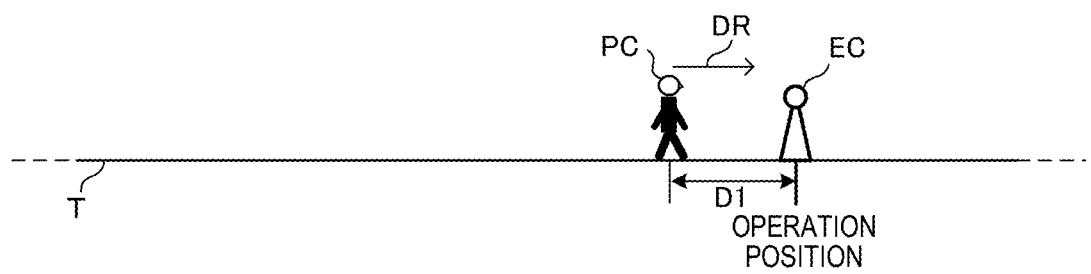

FIGS. 10A and 10B are diagrams showing the relationship among the party character PC, the enemy character EC, and the operation position. FIG. 10A shows a state in which the enemy character EC is disposed at the arrangement position. In the example of the present embodiment, the operation position is set at a position away from the party character PC to the front by a predetermined distance D 1. Then, as the music playback progresses, the party character PC moves along the movement path T in the movement direction DR. Thereby, the party character PC approaches the enemy character EC. Further, the operation position also moves as the party character PC moves. That is, as the music playback progresses, the distance between the enemy character EC and the operation position decreases. Finally, as shown in FIG. 10B, the timing at which the position of the enemy character EC overlaps with the operation position is the operation timing at which the user is to input the operation.

The enemy character EC is disposed at the arrangement position, based on the corresponding operation timing. Specifically, the enemy character EC corresponding to the operation timing that comes when one measure has elapsed from the current playback position of the music is disposed at the arrangement position. As shown in FIG. 10A, as the arrangement position, a position which overlaps the operation position when one measure has elapsed is calculated. The disposed enemy character EC does not move unless the first condition described later is established. That is, in the example of the present embodiment, the distance between the trigger object (enemy character EC) and the operation position is decreased by moving the operation position. The arrangement position and arrangement timing of the enemy character EC are not limited to the above-described one measure, and any position and timing may be adopted.

Figure 11:
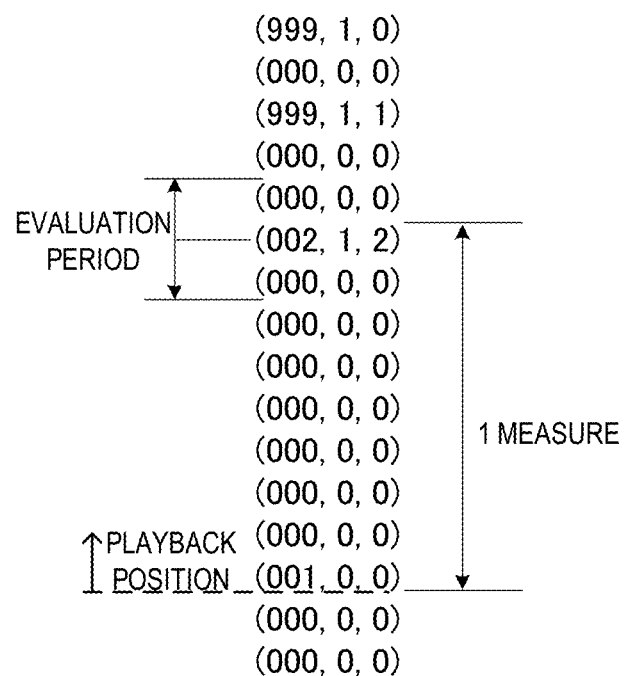
FIG. 11 is a diagram showing an example of timing data corresponding to at least one of the embodiments of the present invention.

The operation timings are set in timing data as shown in FIG. 11. FIG. 11 is a diagram showing an example of timing data. In the timing data, a plurality of operation timings are set in one row in order of time series from the start of music playback. The timing data shown in FIG. 11 is timing data for the movement path T2. In the timing data, for example, the operation timing is set in units of ⅛ measure. Then, at least the enemy characters EC corresponding to the operation timings for one measure from the current playback position is disposed in the game space 50. That is, the enemy characters EC at the operation timings of eight lines (one measure) upward from the current playback position is disposed on the movement path T2 in order of time series from the operation position. As the music playback (playback position) progresses, the range of one measure gradually changes and new enemy characters EC appear in the game space 50.

Figure 12A:
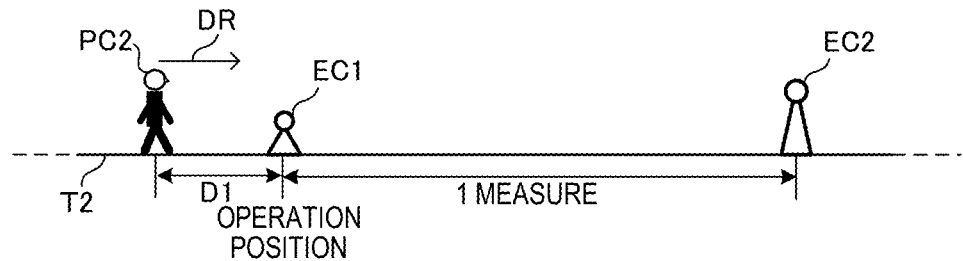
FIGS. 12A, 12B, 12C and 12D are diagrams showing an example of a game space corresponding to at least one of the embodiments of the present invention.

For example, in the game space 50 shown in FIG. 12A, the enemy characters EC1 and EC2 corresponding to the operation timings for one measure from the current playback position shown in FIG. 11 are disposed. FIG. 12A shows a state immediately after the enemy character EC2 is disposed.

In the timing data, for example, (character ID, movement ID, number of possible movements) is set as operation timing information. The character ID is identification information that specifies the type of the enemy character EC, and is 3-digit numerical information. The character ID: 001 is identification information of the enemy character EC1. The character ID: 002 is identification information of the enemy character EC2. The character ID: 000 indicates that the operation timing is not set. Further, the character ID: 999 indicates an operation timing when the enemy character EC2 moves (back).

The movement ID is identification information for specifying a predetermined position where the enemy character EC2 is to move next, and is one-digit numerical information. The movement ID: 0 indicates that there is no movement destination. The number of possible movements is information for specifying the number of times that the enemy character EC2 can move, and is numerical information of one digit. Note that the number of possible movements: 0 indicates that the movement is impossible.

For example, the operation timing (001, 0, 0) at the playback position in FIG. 11 indicates the enemy character EC1 shown in FIG. 12A and indicates that movement is not possible. Further, as shown in FIG. 11, the operation timing overlapping with the playback position indicates the timing at which the user is to input the operation at present. That is, the playback position corresponds to the operation position of the game space 50. Therefore, the enemy character EC at the operation timing overlapping the playback position overlaps the operation position. For example, as shown in FIG. 12A, the enemy character EC1 at the operation timing (001, 0, 0) that overlaps the playback position in FIG. 11 overlaps the operation position.

Further, as shown in FIG. 11, a predetermined period before and after each operation timing set in the timing data is an evaluation period. For example, in FIG. 11, the operation timing (002, 1, 2) is not an evaluation target because the current playback position does not belong to the evaluation period.

Note that the data including the character ID: 000 is not an evaluation target because the operation timing is not set. The data including the character ID: 999 has an invalid operation timing and is not an evaluation target, but the data is an evaluation target when set to valid (valid setting data to be described later).

Next, the movement of the enemy character EC2 will be described. In the example of the present embodiment, only the enemy character EC2 moves after being disposed in the game space 50. The enemy character E2 is first disposed at the arrangement position corresponding to the operation timing (002, M, N) (M, N: any integer) in the game space 50. Thereafter, when the first condition is satisfied, it moves to a position (movement position) corresponding to the operation timing (999, M, N−1). Further, when the second condition different from the first condition is satisfied, the disposed enemy character EC2 disappears, and a balloon object (substitute object) is disposed at the position (movement position) corresponding to the operation timing (999, M, T) (T: any integer, T<N). The first condition and the second condition will be described later.

For example, a case where the enemy character EC2 corresponding to the operation timing (002, 1, 2) shown in FIG. 11 satisfies the first condition will be described. The enemy character EC2 is first disposed at the arrangement position corresponding to the operation timing (002, 1, 2). Thereafter, when the first condition is satisfied, the enemy character EC2 moves to a movement position (predetermined position) Q1 corresponding to the operation timing (999, 1, 1). Further, when the first condition is satisfied, the enemy character EC2 moves to a movement position (predetermined position) Q2 corresponding to the operation timing (999, 1, 0).

Figure 12B:
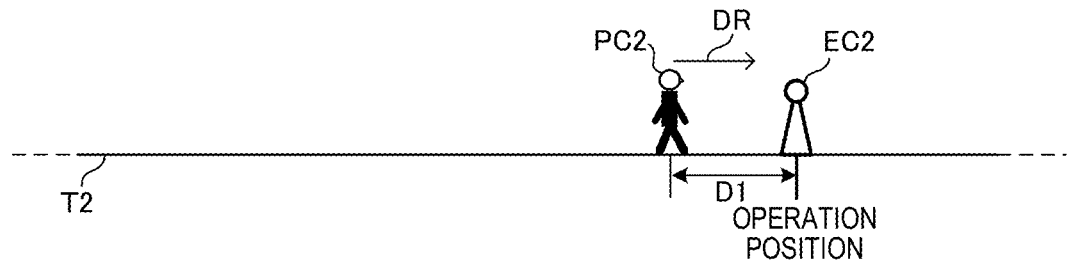
Figure 12C:
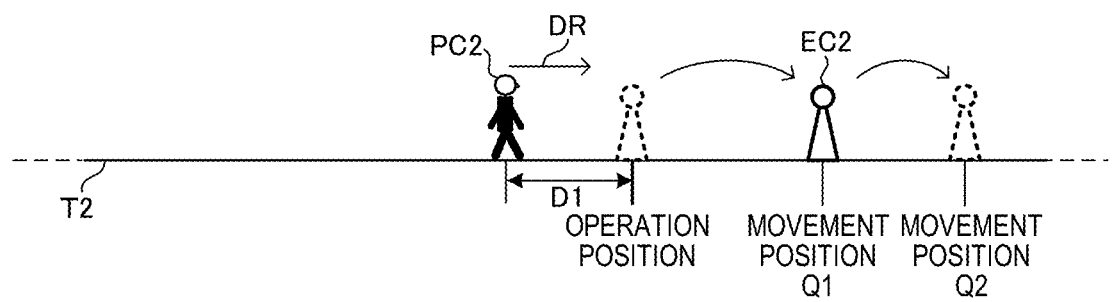

In the case of the above example, the enemy character EC2 is first disposed at the arrangement position as shown in FIG. 12A. Thereafter, as shown in FIG. 12B, the user performs an operation input at the operation timing when the enemy character EC2 overlaps the operation position. Further, the party character PC2 attacks the enemy character EC2 in response to the operation input. Thereafter, as shown in FIG. 12C, the enemy character EC2 moves to the movement position Q1 so as to fly by the impact of this attack. Thereafter, similarly, when the first condition is established again, the enemy character EC2 moves to the movement position Q2. Finally, the enemy character EC2 disappears by the third attack of the party character PC2.

Note that the party character PC2 does not attack, when the user does not input an operation, or when the user inputs an operation but the operation input timing deviates greatly from the operation timing. The determination of the attack is performed, for example, by the same method as the evaluation. That is, when the operation input evaluation is "EXCELLENT" or "GOOD", the attack by the party character PC2 is performed, and when "MISS", the attack is not performed.

Further, when the enemy character EC2 satisfies the second condition, an object of the balloon BO (substitute object) is disposed at a movement position to which the enemy character EC2 moves when the first condition is satisfied.

For example, a case where the enemy character EC2 corresponding to the operation timing (002, 1, 2) shown in FIG. 11 satisfies the second condition will be described. As described above, the enemy character EC2 is disposed at the arrangement position corresponding to the operation timing (002, 1, 2). Thereafter, when the second condition is satisfied, the balloons BO (BO1, BO2) are disposed at the movement positions Q1, Q2, respectively.

Figure 12D:
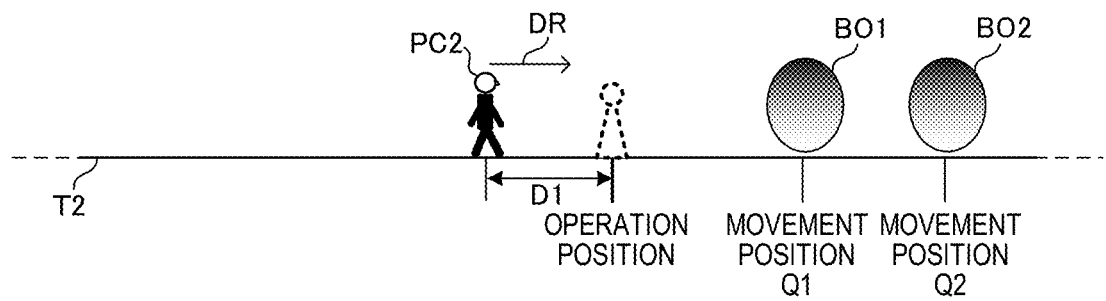

In the case of the above example, the enemy character EC2 is first disposed at the arrangement position as shown in FIG. 12A. Thereafter, as shown in FIG. 12B, the user performs an operation input at the operation timing when the enemy character EC2 overlaps the operation position. Further, the party character PC2 attacks the enemy character EC2 in response to the operation input. Thereafter, as shown in FIG. 12D, the enemy character EC2 disappears, and balloons BO1 and BO2 are disposed at the movement positions Q1 and Q2. The balloon BO is also a trigger object.

In the example of the present embodiment, the operation timing for the enemy character EC2 after the movement and the operation timing for the balloon BO are also evaluation targets. Since the timing tables for the movement paths T1 and T3 are the same, the description thereof is omitted.

Next, the first condition and the second condition will be described. In the example of the present embodiment, the enemy character EC is set with a numerical parameter of the vitality (HP). The enemy character EC becomes unable to fight and disappears when the vitality is less than 1 (HP=0). The party character PC is set with a numerical parameter of attack power. The attack power is information indicating the strength of the attack.

The attack power varies depending on the party character PC and increases as the party character PC grows. When the enemy character EC is attacked by the party character PC, the vitality of the enemy character EC is reduced by an amount corresponding to the attack power of the party character PC. Therefore, the enemy character EC may or may not be able to fight by one attack, depending on the attack power of the party character PC. Note that the calculation of the amount of decrease in vitality using attack power or the like is a general configuration, and thus a detailed description thereof is omitted.

The first condition includes that the enemy character EC2 for which the operation input has been performed is attacked and the vitality of the enemy character EC2 is equal to or greater than a predetermined value (HP=1). That is, when the enemy character EC2 is attacked but is not unable to fight, the first condition is established. Therefore, the establishment of the first condition implements an effect in which the enemy character EC2 flies under attack.

The second condition includes that the enemy character EC2 for which the operation input has been performed is attacked and the vitality of the enemy character EC2 is less than a predetermined value (HP=1). That is, when the enemy character EC2 is attacked and becomes unable to fight, the second condition is established. Therefore, the establishment of the second condition implements an effect in which the enemy character EC2 disappears due to attack damage, and a balloon BO, which is a substitute object, appears instead.

In addition, as illustrated in FIG. 12C, after moving to the movement position Q1 while satisfying the first condition, the enemy character EC2 may satisfy the second condition. In this case, the balloon BO is disposed at the movement position Q2.

Further, in the example of the present embodiment, even when there is an attack by the party character PC having the lowest attack power, the maximum value (initial value) of the vitality (HP) of the enemy character EC2 is set such that the enemy character EC2 becomes HP=0 always, in a state where the number of possible movements of the enemy character EC2 is zero.

In the example of the present embodiment, the operation position is not displayed on the game image. The user performs an operation input while visually checking the enemy character EC and the timing guide TG.

FIGS. 13A to 13D are diagrams illustrating an example of the operation of the timing guide TG The timing guide TG is displayed superimposed on each enemy character EC that has appeared in the game space 50. The timing guide TG is a guide marker that guides the operation timing for the enemy character EC, by notifying the user of the positional relationship between the enemy character EC and the operation position according to a change in form.

Figure 13A:
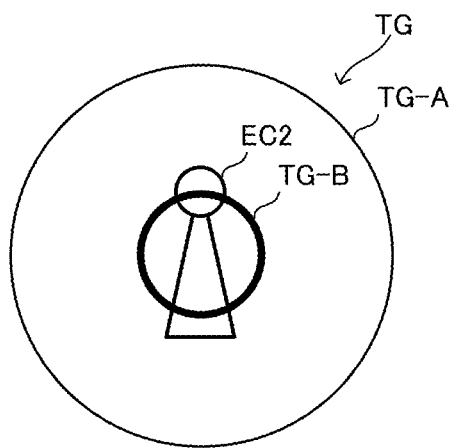
FIGS. 13A, 13B, 13C, and 13D are diagrams showing an example of the operation of a guide marker corresponding to at least one of the embodiments of the present invention.
Figure 13B:
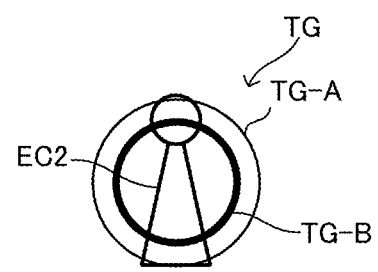

The timing guide TG appears at a timing when the distance between the enemy character EC and the operation position becomes a predetermined value (for example, ½ measure). For example, a timing guide TG as shown in FIG. 13A appears. The timing guide TG includes a ring TG-A and a ring TG-B. The diameter of the ring TG-A decreases in the order shown in FIGS. 13A to 13D. The size of the ring TG-B does not change.

Figure 13C:
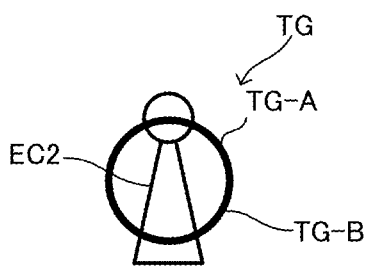
Figure 13D:
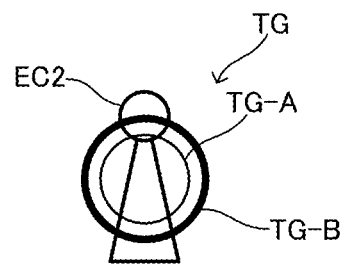

As shown in FIG. 13C, the operation timing for the enemy character EC2 is when the ring TG-A and the ring TG-B overlap each other. That is, FIG. 13C shows that the enemy character EC2 overlaps the operation position. Note that the timing guide TG disappears, when there is a user operation input or when the enemy character EC disappears.

Figure 14:
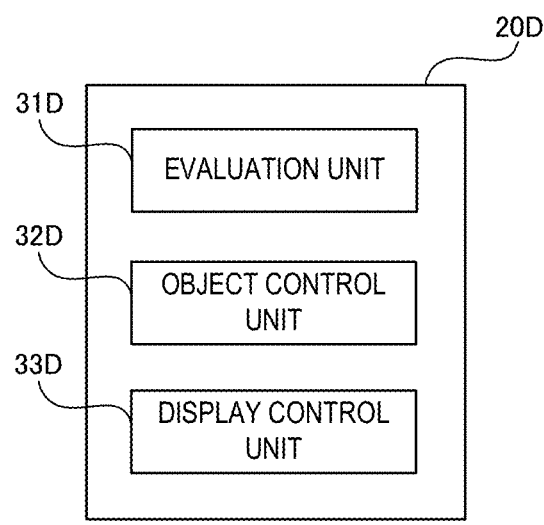
FIG. 14 is a block diagram showing a configuration of a terminal device corresponding to at least one of embodiments of the present invention.

FIG. 14 is a block diagram illustrating a configuration of a terminal device 20D that is an example of the terminal device 20. In the example of the present embodiment, the terminal device 20C includes at least an evaluation unit 31D, an object control unit 32D, and a display control unit 33D.

The evaluation unit 31D evaluates the operation input, based on the operation input timing of the operation unit for the trigger object (the enemy character EC, the balloon BO) and the operation timing associated with the data (music data) used for music playback. The operation timing is set in timing data described above. As described above, an operation input at an operation timing at which the current playback position belongs to the evaluation period is an evaluation target. Evaluations of "EXCELLENT", "GOOD", and "MISS" are made in ascending order of deviation between the user operation input and the operation timing. In addition, a score corresponding to this evaluation is added to the total score. When the button of the game controller to which the user inputs operation is incorrect, the evaluation is "MISS".

Figure 15:
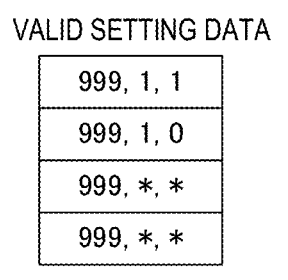

The evaluation unit 31D also evaluates operation inputs to the enemy character EC2 and the balloon BO after the movement to a predetermined position. The evaluation unit 31D refers to the timing data and the valid setting data, and specifies an effective operation timing to be evaluated. FIG. 15 is a diagram illustrating an example of valid setting data.

In the timing data, among the operation timings including the character ID: 999, information on the operation timing that is valid (evaluation target) is set in the valid setting data. That is, in the example of the present embodiment, among the operation timings set in the timing data, the operation timing including the character ID: 001, 002 and the operation timing including the character ID: 999 set in the valid setting data are evaluation targets. The valid setting data is set by the object control unit 32D.

As described above, the object control unit 32D disposes the enemy character EC for one measure at the arrangement position, based on the timing data. Then, the object control unit 32D moves the party character PC (operation position) such that the distance between the enemy character and the operation position decreases, based on the operation timing corresponding to each enemy character EC.

The object control unit 32D manages trigger objects (the enemy character EC and the balloon BO) disposed in the game space 50 using a management table as shown in FIG. 16. FIG. 16 is a diagram illustrating an example of the management table. FIG. 16 is a management table of the enemy character EC appearing on the movement path T2. FIG. 16 shows a state where two enemy characters EC1, EC2 appear in the game space 50 as shown in FIG. 12A. Since the management tables related to the movement paths T1 and T3 have the same configuration, the description thereof is omitted.

The management table includes fields of a character ID, operation timing, current position, and HP. In the character ID field, identification information of the enemy character EC and the balloon BO currently disposed in the game space 50 is set. In the character ID field, a character ID included in the corresponding operation timing is set. The operation timing, current position, and HP are associated with the character ID.

In the operation timing field, corresponding operation timing information is set. For example, the uppermost information shown in FIG. 16 shows information of the enemy character EC1 corresponding to the operation timing (001, 0, 0) shown in FIG. 11. Further, for example, the second level information shown in FIG. 16 shows information on the enemy character EC2 corresponding to the operation timing (002, 1, 2) shown in FIG. 11. In the case of the enemy character EC2, the operation timing is changed when the first condition is established.

In the current position field, the current position of the enemy character EC or the like is set. For example, coordinate information on the movement path T is set. The current value of vitality is set in the HP field. Note that the initial value of vitality of the enemy character EC is set to the maximum value included in the game data.

Further, the object control unit 32D causes the enemy character EC to disappear from the game space 50 by deleting the information of the enemy character EC whose vitality is 0 (HP=0) from the management table.

Further, the object control unit 32D determines whether the first condition and the second condition are established with respect to the enemy character EC2 whose number of possible movements is not 0, among the enemy characters EC in the management table. When the enemy character EC2 for which the operation input has been performed satisfies the first condition, the object control unit 32D moves the enemy character EC2 to a predetermined position where the distance between the enemy character EC2 and the operation position increases. That is, as described above, the object control unit 32D refers to the timing data, and specifies the operation timing of the character ID: 999 having the same movement ID as the operation timing of the enemy character EC2 and one smaller number of possible movements. Then, the operation timing field in the management table of the enemy character EC2 is changed (updated) to the specified operation timing. For example, in the case of the enemy character EC2 with the character ID: 002 shown in FIG. 16, the operation timing is changed from (002, 1, 2) to (999, 1, 1).

Further, the object control unit 32D updates the current position of the enemy character EC2 (moves to a predetermined position), based on the specified operation timing. Further, the object control unit 32D sets the specified operation timing to valid setting data as shown in FIG. 15. Thereafter, the object control unit 32D moves the operation position such that the distance decreases again.

Further, when the enemy character EC2 for which the operation input has been performed satisfies the second condition, the object control unit 32D disposes the substitute object (balloons BO) for the enemy character EC2 at a movement position (predetermined position). That is, as described above, the object control unit 32D refers to the timing data and specifies all the operation timings having the same movement ID as the operation timing of the enemy character EC2. The balloons BO are disposed in movement positions (predetermined positions) corresponding to all the specified operation timings.

Therefore, for example, in the case of the enemy character EC2 having the character ID: 002 shown in FIG. 16, when the second condition is established, the operation timings (999, 1, 1), (999, 1, 0) are specified. Therefore, the balloons BO are disposed at the movement positions Q1 and Q2 corresponding to the two operation timings. In this case, the object control unit 32D deletes information from the management table of the enemy character EC2 that satisfies the second condition. Then, the object control unit 32D additionally sets the object information of the balloons BO corresponding to all the specified operation timings in the management table. That is, together with the character ID: 150 of the balloon BO, all the specified operation timings, the current position, HP, and the like are additionally set. Note that the maximum value included in the game data is set as the initial value of vitality (HP) of the balloon BO. Therefore, for example, in the case of the enemy character EC2 having the character ID: 002 shown in FIG. 16, when the second condition is established, information such as the character ID: 002 of the enemy character EC2 is deleted from the management table, and the information on the two balloons BO (character ID: 150) corresponding to the specified operation timings (999, 1, 1) and (999, 1, 0) is additionally set in the management table.

Further, the object control unit 32D sets, in the valid setting data as shown in FIG. 15, all the operation timings specified by the establishment of the second condition. Thereafter, the object control unit 32D moves the party character PC (operation position) such that the distance between the balloon BO and the operation position decreases.

Further, the object control unit 32D controls the movement of the party character PC and the attacking action. That is, the object control unit 32D moves the party character PC on the movement path T at a constant speed, as described above. Further, the object control unit 32D causes the party character PC to perform an attacking action, when the user's operation input has an appropriate evaluation. In addition, the object control unit 32D determines whether the attack of the party character PC is successful, and decreases the current value of vitality of the enemy character EC. The success determination may be performed by, for example, determining a collision between characters.

The maximum value that makes the enemy characters EC2 and BO always become unable to fight when there is an attack by any party character is set as the initial value of the enemy characters EC and BO vitality (HP).

The display control unit 33D generates a game image as shown in FIG. 9 according to the operation result of each object by the object control unit 32D and displays the game image on the display unit.

Next, the operation of the game system 100 (system 100) of this embodiment will be described.

Figure 17:
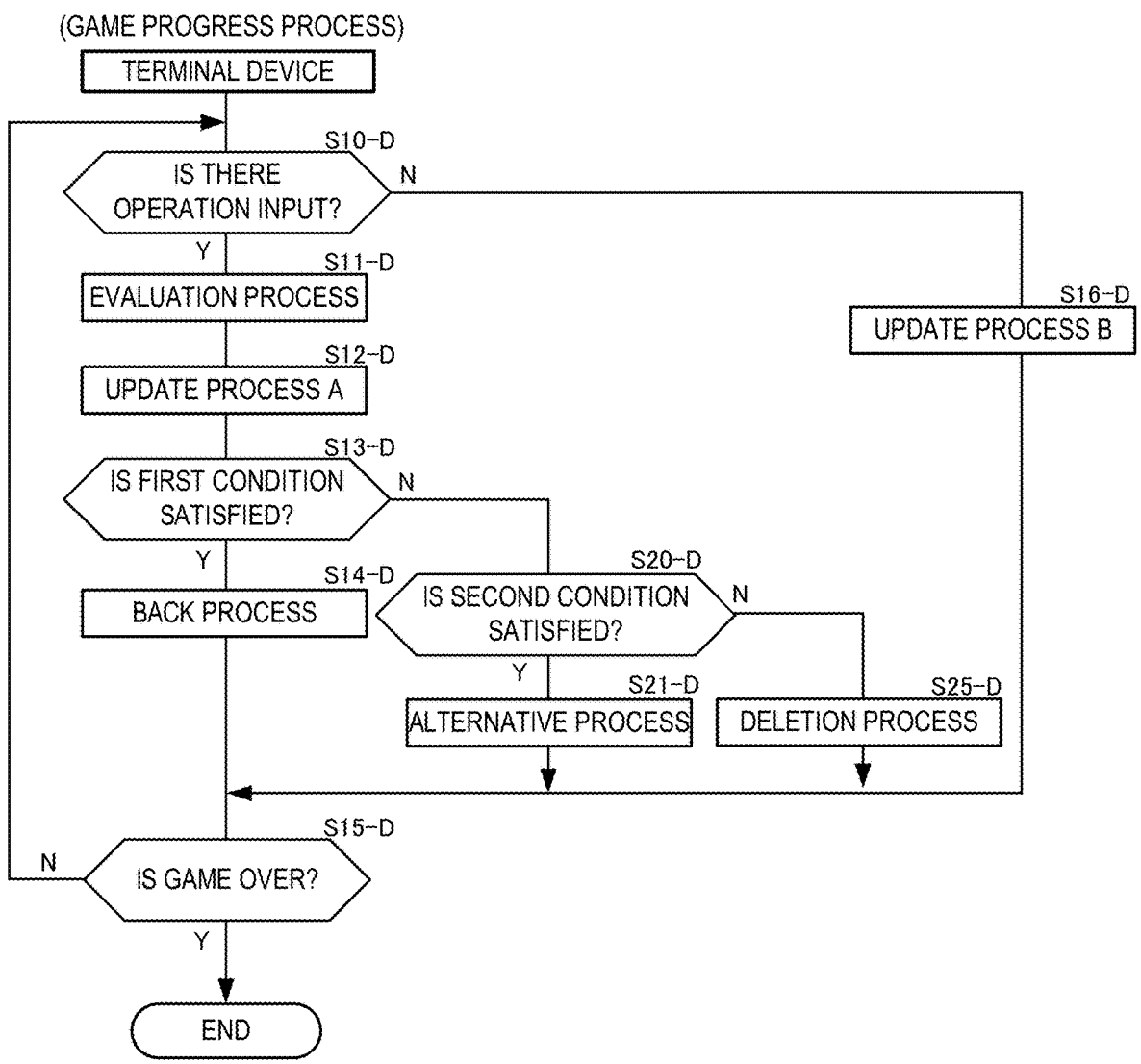
FIG. 17 is a flowchart showing an example of a game progress process corresponding to at least one of the embodiments of the present invention.

FIG. 17 is a flowchart illustrating an example of a game progress process executed by the system 100. In the game progress process, a process for progressing the game, such as a process for controlling the movement of the trigger object such as the enemy object EC and the balloon BO and an evaluation process, is performed. Hereinafter, a case where the terminal device 20D executes the game progress process will be described as an example. Note that FIG. 17 mainly shows a process for controlling the movement of the trigger object and an evaluation process, and a part of the other game progress processes is omitted. The flowchart showing the operation of the server device is omitted from the viewpoint of avoiding redundant explanation.

The game progress process of this example is performed, for example, when there is an operation input for starting a game (music playback) by the user.

Note that the terminal device 20D generates a game image including an image of the game space in which the trigger object appears, at a predetermined timing (for example, every 1/60 seconds) in accordance with the processing result of the game progress process, during the execution of the game progress process, and displays the game image on a display screen.

The terminal device 20D determines whether or not there is an operation input (step S10-D). As described above, it is determined whether or not there is an operation input in the evaluation period corresponding to one trigger object. Further, the terminal device 20D may determine whether or not there is an operation input, based on the operation information received from the operation unit. When there is no operation input (step S10-D: NO), the terminal device 20D proceeds to the process of step S16-D.

On the other hand, when there is an operation input (step S10-D: YES), the terminal device 20D performs an evaluation process (step S11-D). In the evaluation process, as described above, the user's operation input is evaluated based on the degree of coincidence between the user's operation input and the operation timing, based on the timing data. Further, in the evaluation process of the example of the present embodiment, the valid setting data is also referred to, and the operation inputs to the trigger object (enemy character EC2) and the substitute object (balloon BO) after the movement to a predetermined position are also evaluated.

Next, the terminal device 20D performs an object update process A (step S12-D). In the update process A, the terminal device 20D updates the operation of each object in the game space 50. For example, the terminal device 20D updates the management table based on each operation timing, and causes the trigger object (enemy character EC) to appear at the arrangement position. Further, for example, the terminal device 20D moves the party character PC toward the enemy character EC or the like. Further, for example, the terminal device 20D refers to the management table and moves the trigger object (enemy character EC2) to the movement position (predetermined position) based on the management table updated in the back process described later. Further, the terminal device 20D refers to the management table, and causes the substitute object (balloon BO) added in the alternative process described later to appear at the movement position (predetermined position).

Further, in the update process A, the terminal device 20D causes the party character PC to attack the trigger object (enemy character EC, balloon BO) for which the operation input has been performed, based on the evaluation with respect to the operation input. Then, the value of vitality of the attacked enemy character EC is reduced. That is, the HP value in the management table is updated. Further, in the update process A, as described above, the timing guide TG is controlled.

Thereafter, the terminal device 20D determines whether or not the first condition is satisfied (step S13-D). That is, based on the update result in the update process A, the terminal device 20D determines whether or not one trigger object for which the operation input has been performed satisfies the first condition. In the example of the present embodiment, it is determined that the enemy character EC having the number of possible operations: 0 and the balloon BO do not satisfy the first condition and the second condition.

When the first condition is satisfied (step S13-D: YES), the terminal device 20D performs a back process (step S14-D). In the back process, a process for moving the one trigger object (enemy character EC2) for which the operation input has been performed to the movement position (predetermined position) is performed. As described above, the terminal device 20D updates the information on the enemy character EC2 in the management table.

Further, in the back process of the example of the present embodiment, a setting for enabling the operation timing corresponding to the trigger object to return to the predetermined position is performed (valid setting). As described above, the terminal device 20D sets the operation timing corresponding to the enemy character EC2 to return to the predetermined position in the valid setting data. Thereafter, the terminal device 20D proceeds to the process of step S15-D.

On the other hand, when the first condition is not satisfied (step S13-D: NO), the terminal device 20D determines whether or not the second condition is satisfied (step S20-D). That is, based on the update result in the update process A, the terminal device 20C determines whether or not the trigger object for which the operation input has been performed satisfies the second condition. When the second condition is satisfied (step S20-D: YES), the terminal device 20D performs the alternative process (step S21-D). In the alternative process, a process for disposing the substitute object, instead of the one trigger object (enemy character EC2) for which the operation input has been performed, at the movement position (predetermined position) is performed. In the example of the present embodiment, the enemy character EC2 is deleted from the game space 50, and a new balloon BO appears in the game space 50. Specifically, as described above, the terminal device 20D deletes the information on the enemy character EC2 from the management table, and additionally sets information on the balloon BO in the management table.

In the alternative process, as in the back process of step S12-D, a setting for enabling the operation timing corresponding to the substitute object disposed at the movement position (predetermined position) is performed (valid setting). As described above, the terminal device 20D sets the operation timing corresponding to the balloon BO to be disposed at the predetermined position in the valid setting data. Thereafter, the terminal device 20D proceeds to the process of step S15-D.

On the other hand, when the second condition is not satisfied (step S20-D: NO), the terminal device 20D executes a deletion process (step S25-D). In the deletion process, a process of causing the trigger object (enemy object EC, balloon BO) that does not satisfy the first condition and the second condition and satisfies HP=0, among trigger objects that have received the operation input, to disappear from the game space 50 is performed. Specifically, the terminal device 20D deletes the information on the trigger object from the management table. Thereafter, the terminal device 20D proceeds to the process of step S15-D.

Returning to the process of step S10-D, when it is determined that there is no operation input, the terminal device 20D executes the object update process B (step S16-D). In the update process B, the same process as the above-described update process A is performed, but the process related to the one trigger object for which the operation input has been performed as in the update process A is not performed. In the update process B, an enemy object whose evaluation period has passed without any operation input is caused to attack the party character PC. Thereby, the value of vitality of the attacked party character PC is reduced. Further, in the update process B, a process of causing the trigger object for which the evaluation period has passed without any operation input to disappear from the game space 50 is performed. Specifically, the terminal device 20D deletes the information on the trigger object made to disappear from the management table.

Thereafter, the terminal device 20D determines whether or not the game is over (step S15-D). When the game is not over (step S15-D: NO), the terminal device 20D returns to the process of step S10-D. On the other hand, when the game is over (step S15-D: YES), the terminal device 20D ends the game progress process.

As described above, as one aspect of the fourth embodiment, since the terminal device 20D includes the evaluation unit 31D, the object control unit 32D, and the display control unit 33D, when the first condition is established, the trigger object (enemy character EC2) for which the operation input has been performed moves to a predetermined position, and the distance between the trigger object and the operation position decreases again. Therefore, the game does not move monotonously, and interest of the game is improved.

Further, when the second condition is established, the substitute object (balloon BO) of the trigger object (enemy character EC2) for which the operation input has been performed is disposed at a predetermined position. That is, depending on the conditions, another object appears from the trigger object. Therefore, the game does not move monotonously, and interest of the game is further improved.

Further, the operation inputs to the trigger object and the substitute object after the movement to a predetermined position are also evaluated. Therefore, for example, when a score based on the evaluation is calculated, the score may increase as the trigger object and the substitute object are disposed at predetermined positions. Therefore, in order to aim for a high score, it becomes a motivation to input an operation also to the trigger object and substitute object disposed at a predetermined position, and interest of the game is further improved. In addition, even when the first condition is not satisfied, when the second condition is satisfied, the operation timing increases, so the opportunity for increasing the operation timing further increases.

In the example of the above-described embodiment, the trigger object is disposed on the movement path, but it may not be on the movement path. For example, the trigger object may be disposed in the vicinity of the movement path. In this case, the operation position may be on a circumference having a radius of a predetermined distance centered on the party character. Then, it may be determined that the operation timing has arrived when the trigger object disposed in the vicinity of the movement path overlaps the circumference.

In the example of the above-described embodiment, the party character (operation position) moves. However, the trigger object may move. Alternatively, the party character (operation position) and the trigger object may move.

The first condition and the second condition in the example of the embodiment described above are conditions such as being attacked by a party character, but are not particularly limited thereto. Any condition may be adopted as long as the condition is related to the trigger object. For example, a condition using an evaluation result of the operation timing for the trigger object may be used.

APPENDIX

The above-described embodiments have been described such that at least the following invention can be carried out by those having ordinary knowledge in the field to which the invention belongs.

[1]

A rhythm game program for causing a computer to implement a function of controlling a progress of a rhythm game by playing a music and displaying a trigger object on a display unit, causing the computer to implement:

an evaluation function of evaluating an operation input, based on a timing of the operation input of an operation unit for the trigger object and an operation timing associated with data used for playing the music; and an object control function of moving at least one of the trigger object and the operation position such that a distance between the trigger object and the operation position decreases, based on the operation timing corresponding to the trigger object, wherein the object control function implements a function of, when the trigger object for which the operation input has been performed satisfies a first condition, moving the trigger object to a predetermined position where the distance increases, and moving at least one of the trigger object and the operation position such that the distance decreases again.

[2]

The rhythm game program according to [1], wherein the evaluation function implements a function of evaluating the operation input for the trigger object after the movement to the predetermined position.

[3]

The rhythm game program according to [1], wherein the object control function implements a function of, when the trigger object for which the operation input has been performed satisfies a second condition different from the first condition, disposing a substitute object different from the trigger object at the predetermined position, and thereafter, moving at least one of the substitute object and the operation position such that the distance between the substitute object and the operation position decreases, and the evaluation function implements a function of evaluating even the operation input for the substitute object.

[4]

The rhythm game program according to [3], wherein the object control function implements a function of causing the attack object of the user to attack the trigger object for which the operation input has been performed, based on the evaluation of the operation input, wherein the first condition includes that the trigger object for which the operation input has been performed is attacked, and the vitality of the trigger object is equal to or greater than a predetermined value, and wherein the second condition includes that the trigger object for which the operation input has been performed is attacked, and the vitality of the trigger object is less than a predetermined value.

[5]
The rhythm game program according to [4],
wherein the object control function implements a function of disposing the attack object so as to face the trigger object across the operation position.

[6]
The rhythm game program according to [4],
wherein the object control function implements a function in which when the operation input for the trigger object is not performed within a determination period of the evaluation, the attack object is attacked from the trigger object.

[7]
The rhythm game program according to [1],
wherein the object control function implements a function of controlling an operation of a guide marker that notifies of the operation timing for the trigger object.

[8]
The rhythm game program according to [1],
wherein the object control function implements a function of hiding the trigger object when the trigger object for which the operation input has been performed does not satisfy the first condition.

[9]
A server device in which the rhythm game program according to any one of [1] to [8] is installed.

[10]
A terminal program for causing a game terminal device to implement a function of displaying a game screen on a display screen of a display device and controlling the progress of a rhythm game,
wherein the game terminal device implements a connection function of connecting to the server device according to [9] via a communication network.

[11]
A rhythm game program for causing a server device connected to a game terminal device that executes a rhythm game by playing a music and displaying a trigger object on a display unit, through a communication network to control a progress of the rhythm game, causing the server device to implement:
an evaluation function of evaluating an operation input, based on a timing of the operation input of an operation unit for the trigger object and an operation timing associated with data used for playing the music; and
an object control function of moving at least one of the trigger object and the operation position such that a distance between the trigger object and the operation position decreases, based on the operation timing corresponding to the trigger object,
wherein the object control function implements a function of, when the trigger object for which the operation input has been performed satisfies a first condition, moving the trigger object to a predetermined position where the distance increases, and moving at least one of the trigger object and the operation position such that the distance decreases again.

[12]
The rhythm game program according to [11],
wherein the evaluation function implements a function of evaluating the operation input for the trigger object after the movement to the predetermined position.

[13]
The rhythm game program according to [11],
wherein the object control function implements a function of, when the trigger object for which the operation input has been performed satisfies a second condition different from the first condition, disposing a substitute object different from the trigger object at the predetermined position, and thereafter, moving at least one of the substitute object and the operation position such that the distance between the substitute object and the operation position decreases, and the evaluation function implements a function of evaluating even the operation input for the substitute object.

[14]
The rhythm game program according to [13],
wherein the object control function implements a function of causing the attack object of the user to attack the trigger object for which the operation input has been performed, based on the evaluation of the operation input,
wherein the first condition includes that the trigger object for which the operation input has been performed is attacked, and the vitality of the trigger object is equal to or greater than a predetermined value, and
wherein the second condition includes that the trigger object for which the operation input has been performed is attacked, and the vitality of the trigger object is less than a predetermined value.

[15]
The rhythm game program according to [14],
wherein the object control function implements a function of disposing the attack object so as to face the trigger object across the operation position.

[16]
The rhythm game program according to [14],
wherein the object control function implements a function in which when the operation input for the trigger object is not performed within the evaluation determination period, the attack object is attacked from the trigger object.

[17]
The rhythm game program according to [11],
wherein the object control function implements a function of controlling an operation of a guide marker that notifies of the operation timing for the trigger object.

[18]
The rhythm game program according to [11],
wherein the object control function implements a function of hiding the trigger object when the trigger object for which the operation input has been performed does not satisfy the first condition.

[19]
A game system including a game terminal device which executes a rhythm game by playing a music and displaying a trigger object on a display unit, and a server device connected to the game terminal device through a communication network, the game system including:
an evaluation controller configured to evaluate an operation input, based on a timing of the operation input of an operation unit for the trigger object and an operation timing associated with data used for playing the music; and
an object controller configured to move at least one of the trigger object and the operation position such that a distance between the trigger object and the operation position decreases, based on the operation timing corresponding to the trigger object, wherein the object controller, when the trigger object for which the operation input has been performed satisfies a first condition, moves the trigger object to a predetermined position where the distance increases, and moves at least one of the trigger object and the operation position such that the distance decreases again.

[20]
The game system according to [19],
wherein the evaluation controller evaluates even the operation input for the trigger object after being moved to the predetermined position.

[21]
The game system according to [19],
wherein the object controller, when the trigger object for which the operation input has been performed satisfies a second condition different from the first condition, disposes a substitute object different from the trigger object at the predetermined position, and thereafter, moves at least one of the substitute object and the operation position such that the distance between the substitute object and the operation position decreases, and the evaluation controller evaluates even the operation input for the substitute object.

[22]
The game system according to [21],
wherein the object controller causes the attack object of the user to attack the trigger object for which the operation input has been performed, based on the evaluation of the operation input,
wherein the first condition includes that the trigger object for which the operation input has been performed is attacked, and the vitality of the trigger object is equal to or greater than a predetermined value, and
wherein the second condition includes that the trigger object for which the operation input has been performed is attacked, and the vitality of the trigger object is less than a predetermined value.

[23]
The game system according to [22],
wherein the object controller disposes the attack object so as to face the trigger object across the operation position.

[24]
The game system according to [22],
wherein the object controller performs control such that when the operation input for the trigger object is not performed within the evaluation determination period, the attack object is attacked from the trigger object.

[25]
The game system according to [19],
wherein the object controller controls an operation of a guide marker that notifies of the operation timing for the trigger object.

[26]
The game system according to [19],
wherein the object controller hides the trigger object, when the trigger object for which the operation input has been performed does not satisfy the first condition.

[27]
A game terminal device that controls a progress of a rhythm game by playing a music and displaying a trigger object on a display unit, the device comprising:
an evaluation controller configured to evaluate an operation input, based on a timing of the operation input of an operation unit for the trigger object and an operation timing associated with data used for playing the music; and an object controller configured to move at least one of the trigger object and the operation position such that a distance between the trigger object and the operation position decreases, based on the operation timing corresponding to the trigger object,
wherein when the trigger object for which the operation input has been performed satisfies a first condition, the object controller moves the trigger object to a predetermined position where the distance increases, and moves at least one of the trigger object and the operation position such that the distance decreases again.

[28]
A rhythm game progress control method for causing a computer to control a progress of a rhythm game by playing a music on a computer and displaying a trigger object on a display unit, the method comprising:
an evaluation process of evaluating an operation input, based on a timing of the operation input of an operation unit for the trigger object and an operation timing associated with data used for playing the music; and
an object control process of moving at least one of the trigger object and the operation position such that a distance between the trigger object and the operation position decreases, based on the operation timing corresponding to the trigger object,
wherein the object control process includes a process of, when the trigger object for which the operation input has been performed satisfies a first condition, moving the trigger object to a predetermined position where the distance increases, and moving at least one of the trigger object and the operation position such that the distance decreases again.

According to one embodiment of the present invention, it is useful for controlling the arrangement of indicator signs (trigger objects) to improve interest of a rhythm game.

What is claimed is:
1. A rhythm game program for causing a computer to implement a function of controlling a progress of a rhythm game by playing a music and displaying a trigger object on a display unit, the program causing the computer to implement:
an evaluation function of evaluating an operation input, based on a timing of the operation input of an operation unit for the trigger object and an operation timing associated with data used for playing the music; and
an object control function of moving at least one of the trigger object and an operation position such that a distance between the trigger object and the operation position decreases, based on the operation timing corresponding to the trigger object,
wherein the object control function implements a function of, when the trigger object for which the operation input has been performed satisfies a first condition, moving the trigger object to a predetermined position where the distance increases, and moving at least one of the trigger object and the operation position such that the distance decreases again.

2. The rhythm game program according to claim 1, wherein the evaluation function implements a function of evaluating the operation input for the trigger object after the movement to the predetermined position.

3. The rhythm game program according to claim 1, wherein the object control function implements a function of, when the trigger object for which the operation input has been performed satisfies a second condition different from the first condition, disposing a substitute object different from the trigger object at the predetermined position, and thereafter, moving at least one of the substitute object and the operation position such that a distance between the substitute object and the operation position decreases, and the evaluation function implements a function of evaluating also the operation input for the substitute object.

4. The rhythm game program according to claim 3, wherein the object control function implements a function of causing an attack object of the user to attack the trigger object for which the operation input has been performed, based on the evaluation of the operation input, wherein the first condition includes that the trigger object for which the operation input has been performed is attacked, and a vitality of the trigger object is equal to or greater than a predetermined value, and wherein the second condition includes that the trigger object for which the operation input has been performed is attacked, and the vitality of the trigger object is less than a predetermined value.

5. The rhythm game program according to claim 4, wherein the object control function implements a function of disposing the attack object so as to face the trigger object across the operation position.

6. The rhythm game program according to claim 4, wherein the object control function implements a function of when the operation input for the trigger object is not performed within a determination period of the evaluation, causing the attack object to be attacked from the trigger object.

7. The rhythm game program according to claim 1, wherein the object control function implements a function of controlling an operation of a guide marker that notifies of the operation timing for the trigger object.

8. The rhythm game program according to claim 1, wherein the object control function implements a function of hiding the trigger object when the trigger object for which the operation input has been performed does not satisfy the first condition.

9. A rhythm game program for causing a server device connected to a game terminal device that executes a rhythm game by playing a music and displaying a trigger object on a display unit, through a communication network to control a progress of the rhythm game, the program causing the server device to implement:

an evaluation function of evaluating an operation input, based on a timing of the operation input of an operation unit for the trigger object and an operation timing associated with data used for playing the music; and an object control function of moving at least one of the trigger object and an operation position such that a distance between the trigger object and the operation position decreases, based on the operation timing corresponding to the trigger object, wherein the object control function implements a function of, when the trigger object for which the operation input has been performed satisfies a first condition, moving the trigger object to a predetermined position where the distance increases, and moving at least one of the trigger object and the operation position such that the distance decreases again.

10. A game system including a game terminal device which executes a rhythm game by playing a music and displaying a trigger object on a display unit, and a server device connected to the game terminal device through a communication network, the game system comprising:

an evaluation controller configured to evaluate an operation input, based on a timing of the operation input of an operation unit for the trigger object and an operation timing associated with data used for playing the music; and an object controller configured to move at least one of the trigger object and an operation position such that a distance between the trigger object and the operation position decreases, based on the operation timing corresponding to the trigger object, wherein when the trigger object for which the operation input has been performed satisfies a first condition, the object controller moves the trigger object to a predetermined position where the distance increases, and moves at least one of the trigger object and the operation position such that the distance decreases again.

* * * * *